US012248260B2

(12) United States Patent
Koyama et al.

(10) Patent No.: US 12,248,260 B2
(45) Date of Patent: Mar. 11, 2025

(54) IMAGE FORMING APPARATUS

(71) Applicant: CANON KABUSHIKI KAISHA, Tokyo (JP)

(72) Inventors: Tomooku Koyama, Suntou-gun (JP); Ken Murooka, Mishima (JP); Wataru Uchida, Yokohama (JP); Jun Agata, Suntou-gun (JP); Yohei Suzuki, Suntou-gun (JP); Daisuke Takamura, Fujinomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/472,325

(22) Filed: Sep. 22, 2023

(65) Prior Publication Data

US 2024/0012350 A1 Jan. 11, 2024

Related U.S. Application Data

(62) Division of application No. 17/971,666, filed on Oct. 24, 2022, now Pat. No. 11,803,139, which is a division of application No. 17/177,235, filed on Feb. 17, 2021, now Pat. No. 11,506,999, which is a division of application No. 16/720,493, filed on Dec. 19, 2019, now Pat. No. 10,955,774, which is a division of application No. 15/868,030, filed on Jan.

(Continued)

(30) Foreign Application Priority Data

Feb. 18, 2013 (JP) ................................ 2013-029061
Feb. 18, 2013 (JP) ................................ 2013-029063
Jan. 29, 2014 (JP) ................................ 2014-014257

(51) Int. Cl.
*G03G 15/20* (2006.01)

(52) U.S. Cl.
CPC ..... *G03G 15/2028* (2013.01); *G03G 15/2017* (2013.01); *G03G 15/2064* (2013.01)

(58) Field of Classification Search
None
See application file for complete search history.

(56) References Cited

U.S. PATENT DOCUMENTS 3,884,623 A 5/1975 Slack
4,378,152 A 3/1983 Edwards et al.

(Continued)

FOREIGN PATENT DOCUMENTS

JP S59-109078 A 6/1984
JP S61-192658 A 8/1986

(Continued)

OTHER PUBLICATIONS

Oct. 3, 2017 Japanese Official Action in Japanese Patent Appln. No. 2014-014257.

(Continued)

*Primary Examiner* — Walter L Lindsay, Jr.
*Assistant Examiner* — Geoffrey T Evans
(74) *Attorney, Agent, or Firm* — Venable LLP

(57) ABSTRACT

An image forming apparatus includes: a fixing portion for fixing an image formed on a recording material; and a guide member for guiding the recording material. The guide member is provided at an entrance to the fixing portion and at an end portion with respect to a direction perpendicular to a feeding direction of the recording material The guide member is moved when the guide member is pushed by the recording material.

16 Claims, 35 Drawing Sheets

Related U.S. Application Data

11, 2018, now Pat. No. 10,551,774, which is a division of application No. 15/175,287, filed on Jun. 7, 2016, now Pat. No. 9,904,222, which is a division of application No. 15/006,305, filed on Jan. 26, 2016, now Pat. No. 9,400,462, which is a division of application No. 14/180,696, filed on Feb. 14, 2014, now Pat. No. 9,280,101.

(56) References Cited

U.S. PATENT DOCUMENTS

| | | | |
|---|---|---|---|
| 4,876,576 | A | 10/1989 | Itaya et al. |
| 4,937,631 | A | 6/1990 | Kim et al. |
| 4,998,121 | A | 3/1991 | Koh et al. |
| 5,027,160 | A | 6/1991 | Okada et al. |
| 5,043,763 | A | 8/1991 | Koh et al. |
| 5,045,892 | A | 9/1991 | Morisawa et al. |
| 5,083,168 | A | 1/1992 | Kusaka et al. |
| 5,118,920 | A | 6/1992 | Tanabe et al. |
| 5,225,874 | A | 7/1993 | Koh et al. |
| 5,300,999 | A | 4/1994 | Koh et al. |
| 5,633,704 | A | 5/1997 | Suzuki et al. |
| 6,299,161 | B1 | 10/2001 | Kang |
| 6,583,389 | B2 | 6/2003 | Murooka et al. |
| 7,077,517 | B2 | 7/2006 | Awai et al. |
| 8,160,487 | B2 | 4/2012 | Hashimoto |
| 8,646,776 | B2 | 2/2014 | Agata et al. |
| 9,146,520 | B2 | 9/2015 | Fuse et al. |
| 9,395,674 | B2 | 7/2016 | Murooka |
| 2002/0176726 | A1 | 11/2002 | Ohuchi et al. |
| 2004/0218953 | A1 | 11/2004 | Gross et al. |
| 2009/0142111 | A1 | 6/2009 | Hashimoto |
| 2010/0189485 | A1 | 7/2010 | Ichikawa |
| 2013/0004213 | A1 | 1/2013 | Takahashi |
| 2014/0126945 | A1 | 5/2014 | Uchida et al. |
| 2014/0219697 | A1 | 8/2014 | Murooka |
| 2014/0234001 | A1 | 8/2014 | Fuse et al. |
| 2014/0314438 | A1 | 10/2014 | Maeda et al. |
| 2014/0356018 | A1 | 12/2014 | Nakamura et al. |
| 2015/0063868 | A1 | 3/2015 | Fukuda et al. |
| 2015/0346658 | A1 | 12/2015 | Tanaka et al. |
| 2016/0252865 | A1 | 9/2016 | Shimodaira |

FOREIGN PATENT DOCUMENTS

| | | | |
|---|---|---|---|
| JP | S61-192659 | A | 8/1986 |
| JP | S63-149681 | A | 6/1988 |
| JP | S63-267980 | A | 11/1988 |
| JP | S63-271383 | A | 11/1988 |
| JP | H03-140985 | A | 6/1991 |
| JP | H08-044230 | A | 2/1996 |
| JP | H09-205826 | A | 8/1997 |
| JP | H11-143254 | A | 5/1999 |
| JP | 2002-072734 | A | 3/2002 |
| JP | 2006-301536 | A | 11/2006 |
| JP | 2009-128505 | A | 6/2009 |
| JP | 4728312 | B2 | 7/2011 |
| JP | 2012-255948 | A | 12/2012 |

OTHER PUBLICATIONS

Feb. 25, 2020 Japanese Official Action in Japanese Patent Appln. No. 2019-075936.

(a)

(b)

(a)

(b)

(a)

(b)

(b)

(a)

IMAGE FORMING APPARATUS

This application is a division of application Ser. No. 17/971,666 filed Oct. 24, 2022, which is a division of application Ser. No. 17/177,235 filed Feb. 17, 2021, U.S. Pat. No. 11,506,999 B2, which is a division of application Ser. No. 16/720,493 filed Dec. 19, 2019, U.S. Pat. No. 10,955,774 B2, which is a division of application Ser. No. 15/868,030 filed Jan. 11, 2018, U.S. Pat. No. 10,551,774 B2, which is a division of application Ser. No. 15/175,287 filed Jun. 7, 2016, U.S. Pat. No. 9,904,222 B2, which is a division of application Ser. No. 15/006,305 filed Jan. 26, 2016, U.S. Pat. No. 9,400,462 B2, which is a division of application Ser. No. 14/180,696 filed Feb. 14, 2014, U.S. Pat. No. 9,280,101 B2.

FIELD OF THE INVENTION AND RELATED ART

The present invention relates to an image forming apparatus such as an electrophotographic copying machine and an electrophotographic printer.

The copying machine or printer of the electrophotographic type includes an image forming portion for forming a toner image on a recording material, a fixing portion (fixing device) for fixing the toner image by heating the toner image formed on the recording material, and the like.

As the fixing device, in many cases, a fixing device of a contact heating type in which the recording material is nipped and fed by a rotatable heating member (heating roller, heating belt or the like) and a rotatable pressing member (pressing roller, pressing belt or the like) for forming a nip in contact with the rotatable heating member to fix the toner image on the recording material.

In the fixing device, in some cases, each of outer configurations (shapes) of the rotatable heating member and the rotatable pressing member with respect to a longitudinal direction is formed in a proper reverse crown shape so as not to generate creases no the recording material in a feeding process of the recording material.

However, in the case where the outer shape of each of the rotatable heating member and the rotatable pressing member is the reversed crown shape, the generation of the creases can be suppressed, but on the other hand, a difference in feeding amount of the recording material is generated between a widthwise central portion and a widthwise end portion, and thus a so-called trailing end leap which is a phenomenon that a trailing end of the recording material is raised is generated in some cases. By this trailing end leap, the recording material contacts peripheral parts in the neighborhood of an entrance to the fixing device to cause image rubbing, and by an impact of the trailing end leap, an image blur or the like which is phenomenon that the toner image before the fixing is peeled from the recording material is caused.

In order to suppress the above-described trailing end leap, a constitution in which an upper guide is provided in the neighborhood of an entrance to the fixing device is disposed in Japanese Laid-Open Patent Application (JP-A) Hei 8-44230 and Japanese Patent No. 4728312.

However, in the above constitution, the upper guide is fixedly provided in the neighborhood of the entrance to the fixing device, and therefore the recording material is fed in a state in which a trailing end of the recording material causing the trailing end leap is pressed against the upper guide, so that there was a fear with respect to abrasion of the upper guide.

SUMMARY OF THE INVENTION

The present invention has been accomplished in view of the above-described circumstances. A principal object of the present invention is to provide an image forming apparatus capable of suppressing a guide abrasion by a recording material while suppressing a trailing end leap of the recording material.

According to an aspect of the present invention, there is provided an image forming apparatus comprising: a fixing portion for fixing an image formed on a recording material; and a guide member for guiding the recording material, wherein the guide member is provided at an entrance to the fixing portion and at an end portion with respect to a direction perpendicular to a feeding direction of the recording material, wherein the guide member is moved when the guide member is pushed by the recording material.

According to another aspect of the present invention, there is provided an image forming apparatus comprising: a fixing portion for fixing an image formed on a recording material; and a guide member for guiding the recording material, wherein the guide member is provided at an entrance to the fixing portion and at an end portion with respect to a direction perpendicular to a feeding direction of the recording material, wherein the guide member is shaped so that a guide portion, of the guide member, contactable with the recording material is inclined, with a distance toward a downstream side of the feeding direction, in a direction of narrowing a recording material feeding path.

These and other objects, features and advantages of the present invention will become more apparent upon a consideration of the following description of the preferred embodiments of the present invention taken in conjunction with the accompanying drawings.

Figure 4:
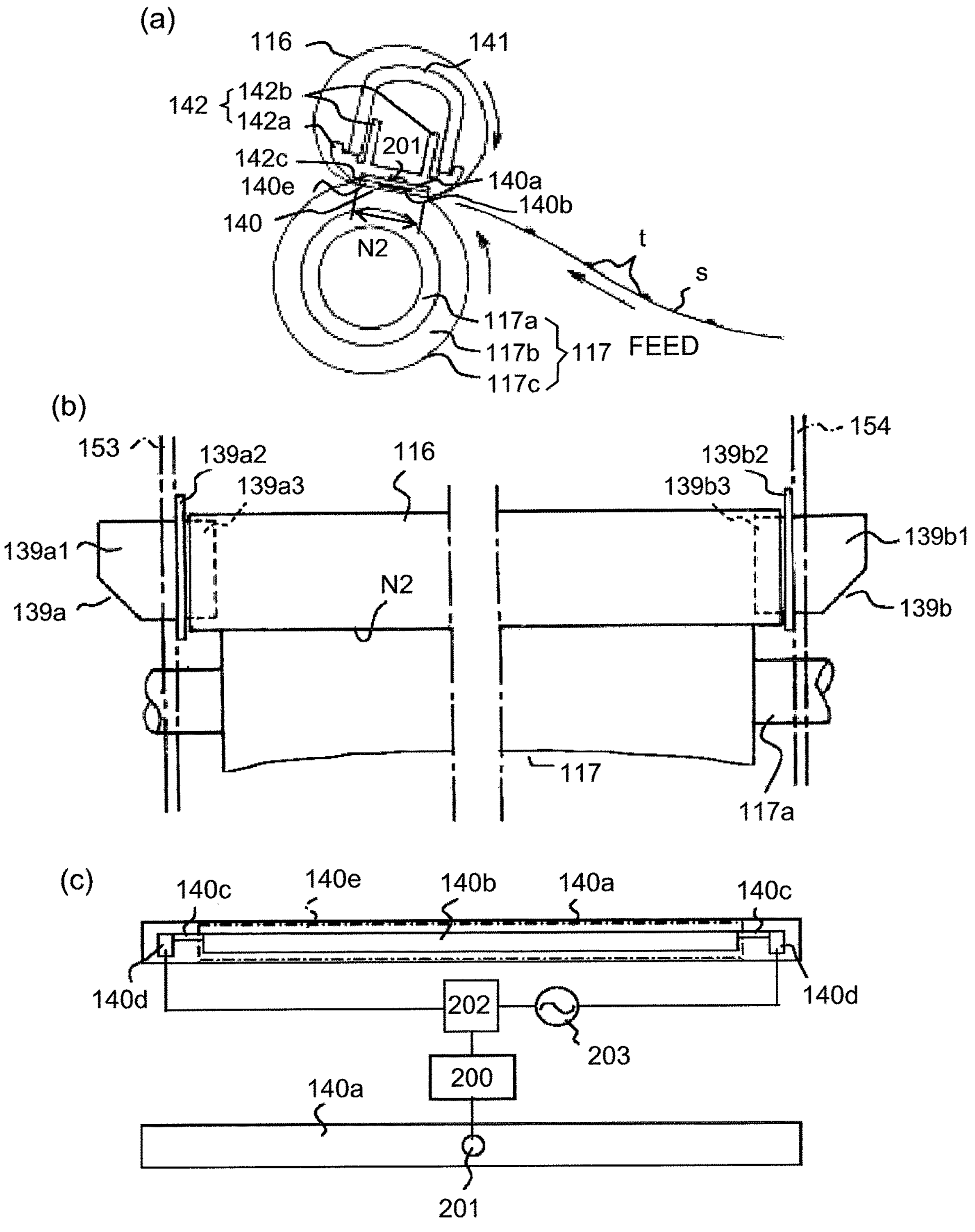

Parts (a) to (c) of FIG. 4 are schematic views of the fixing device using a fixing belt.

Figure 5:
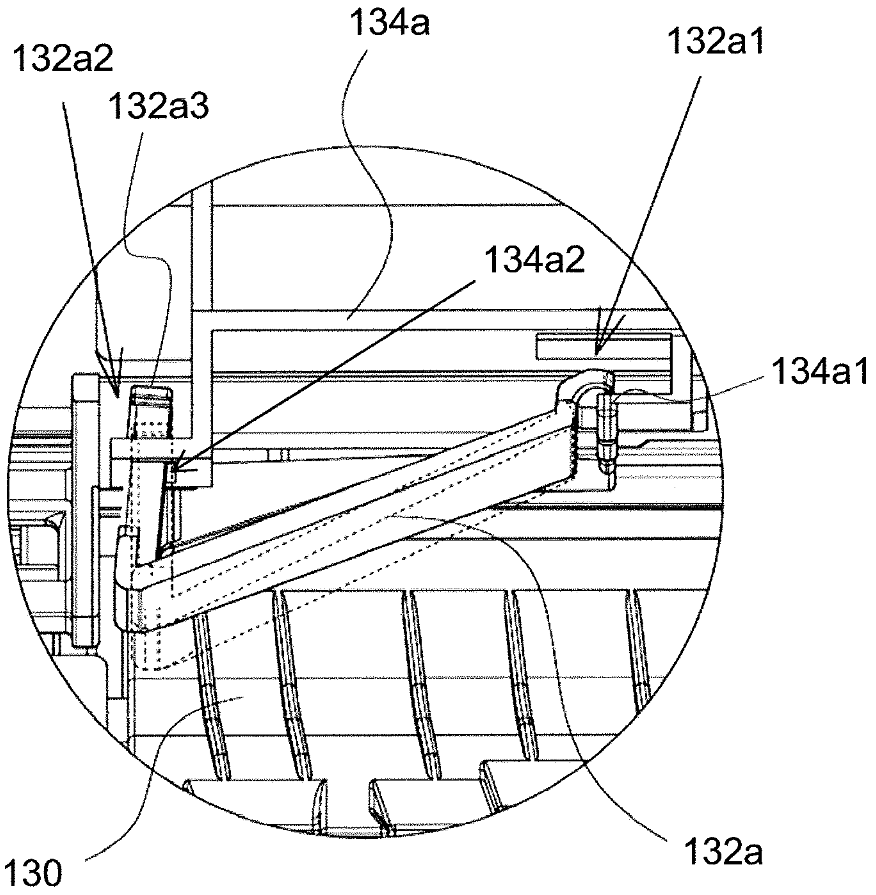

FIG. 5 is an illustration of a swingable guide.

Figure 6:
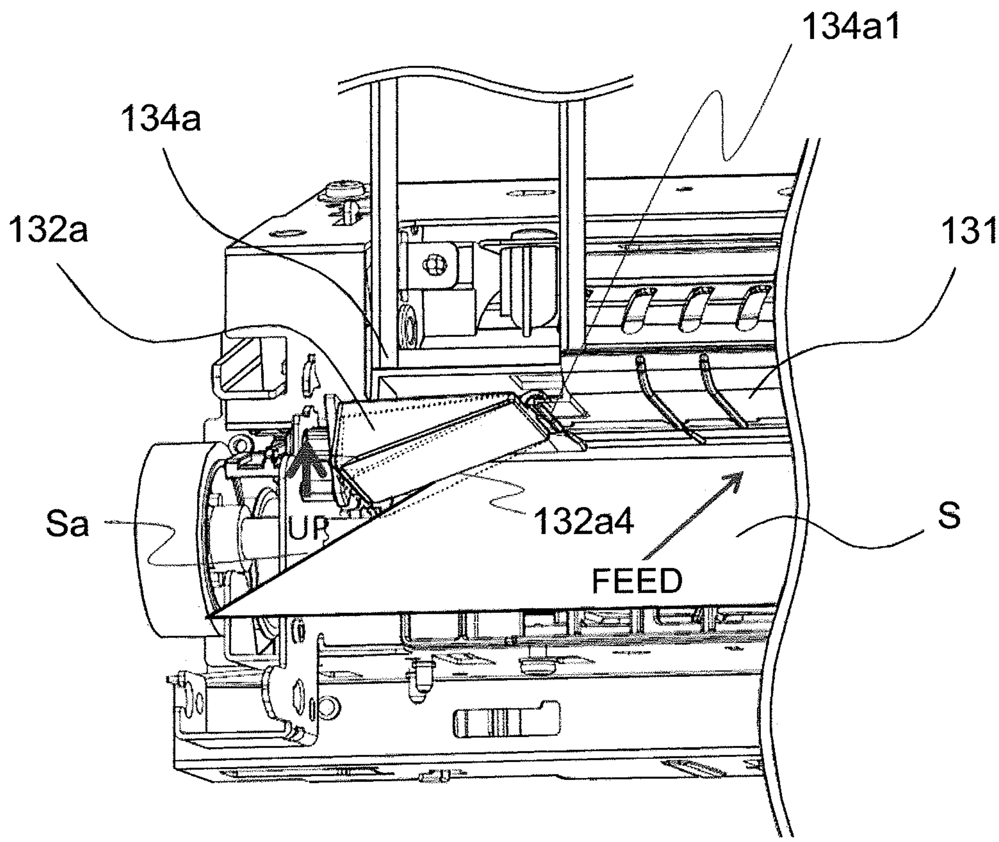

FIG. 6 is a schematic view for illustrating an operation of the swingable guide.

Figure 7:
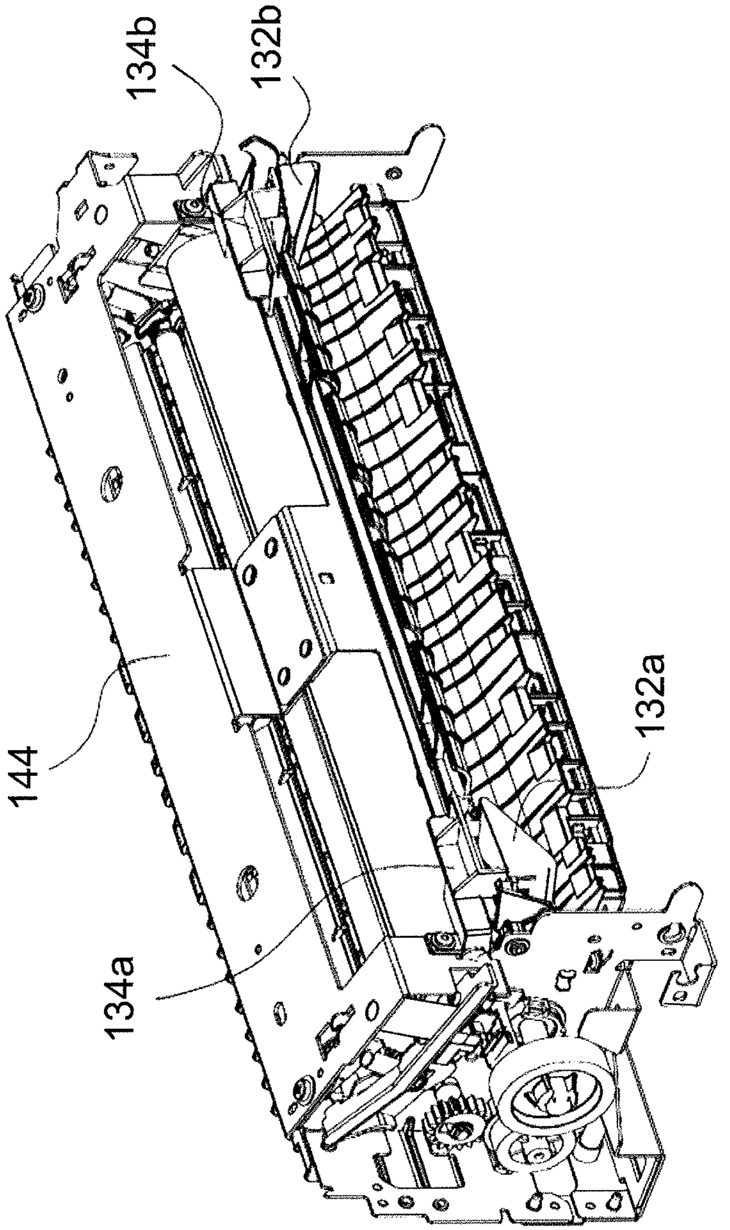

FIG. 7 is a perspective view of a fixing device according to Embodiment 2.

Figure 8:
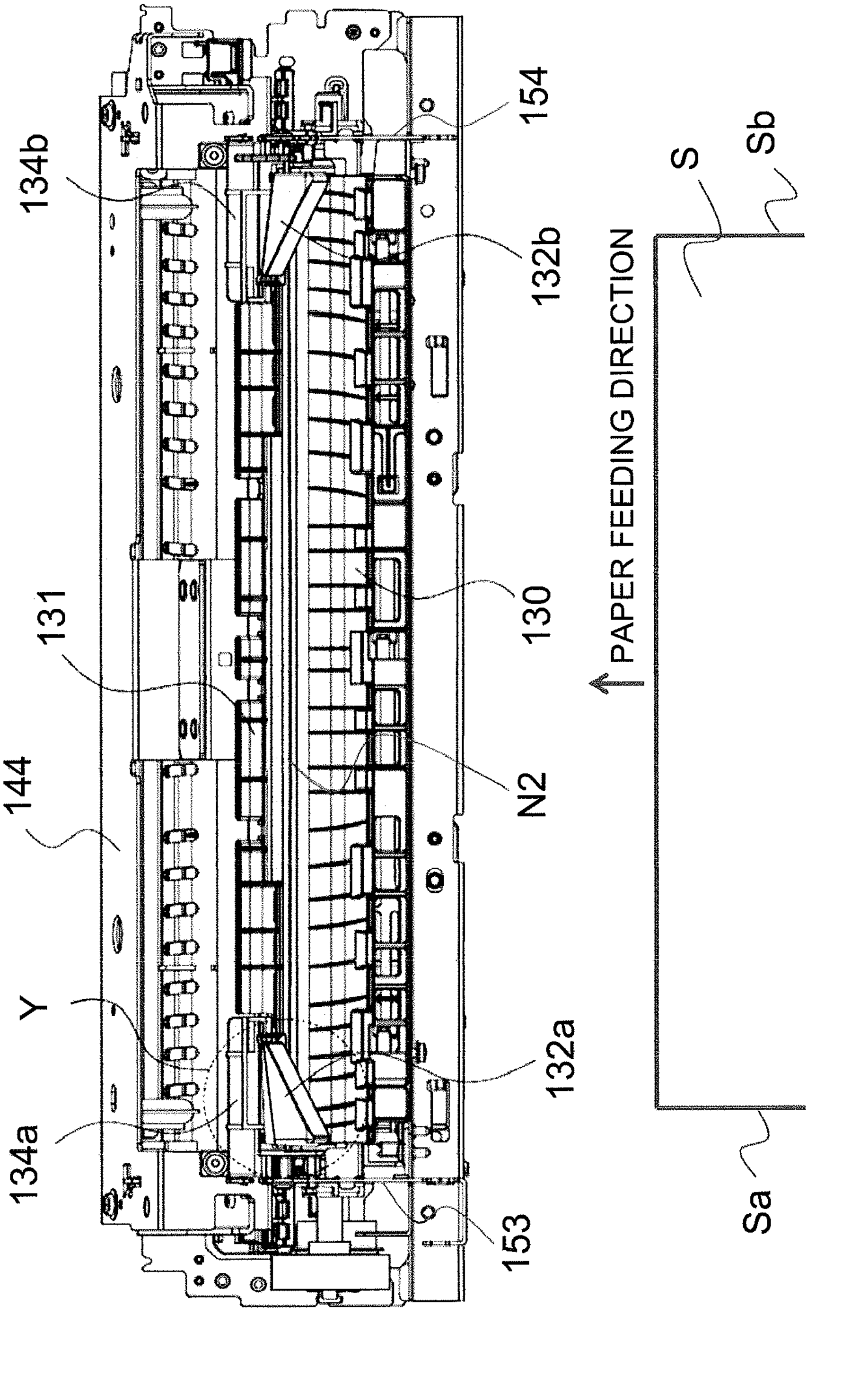

FIG. 8 is a schematic view of the fixing device according to Embodiment 2 as seen from an upstream side of the recording paper feeding direction.

Figure 9:
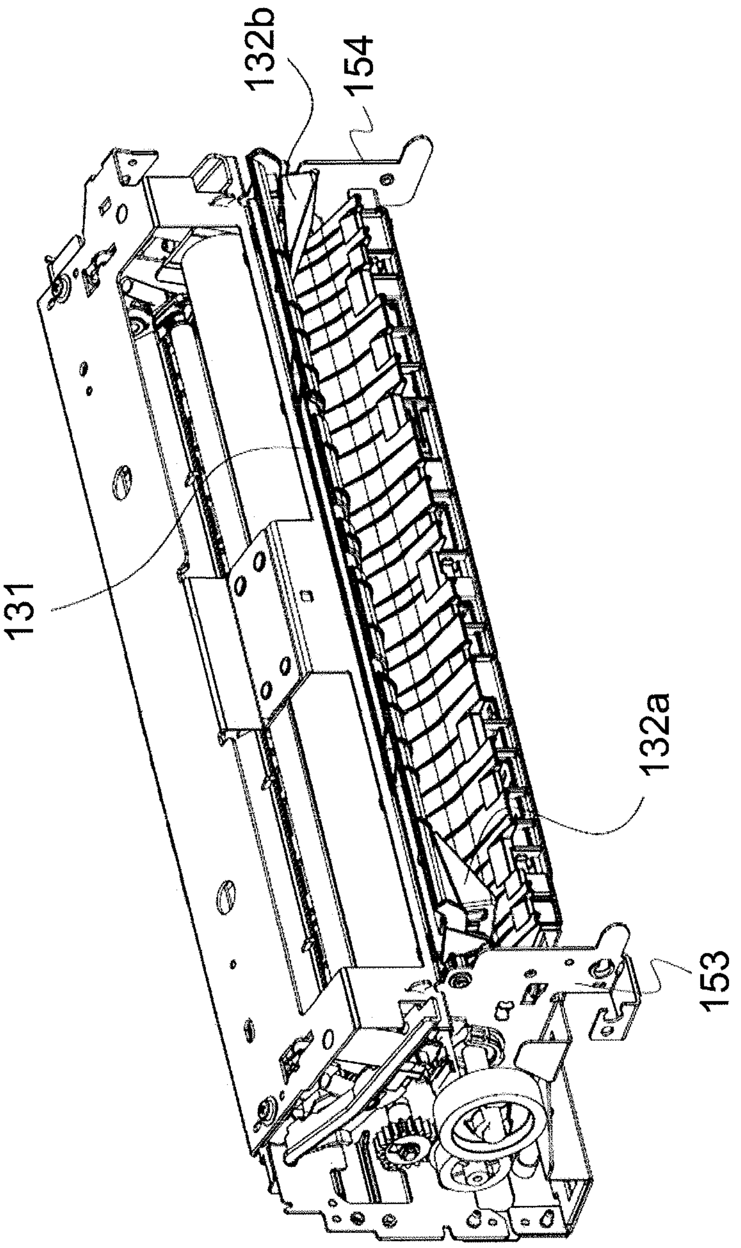

FIG. 9 is a perspective view of a fixing device according to Embodiment 3.

Figure 10:
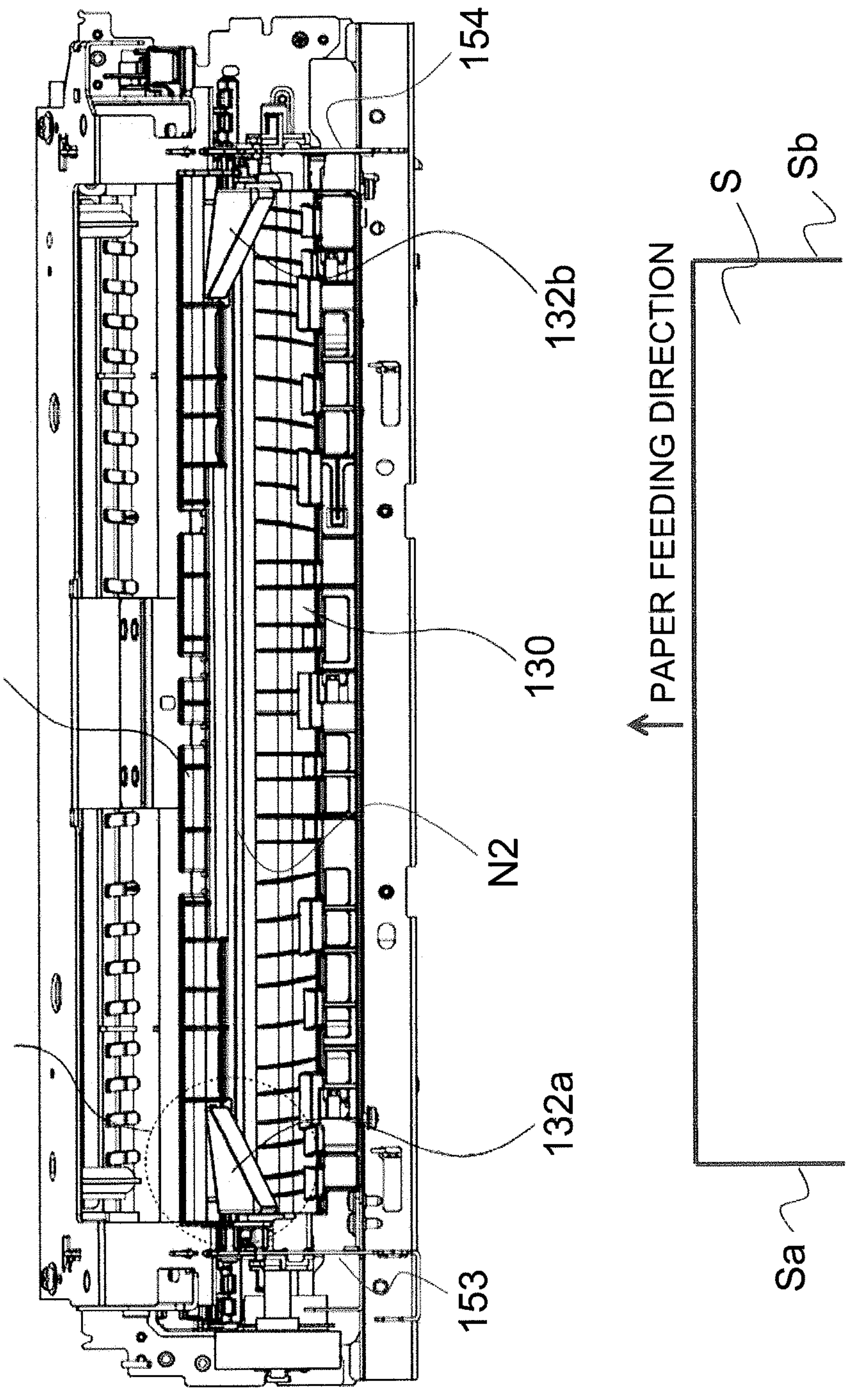

FIG. 10 is a schematic view of the fixing device according to Embodiment 3 as seen from an upstream side of the recording paper feeding direction.

Figure 11:
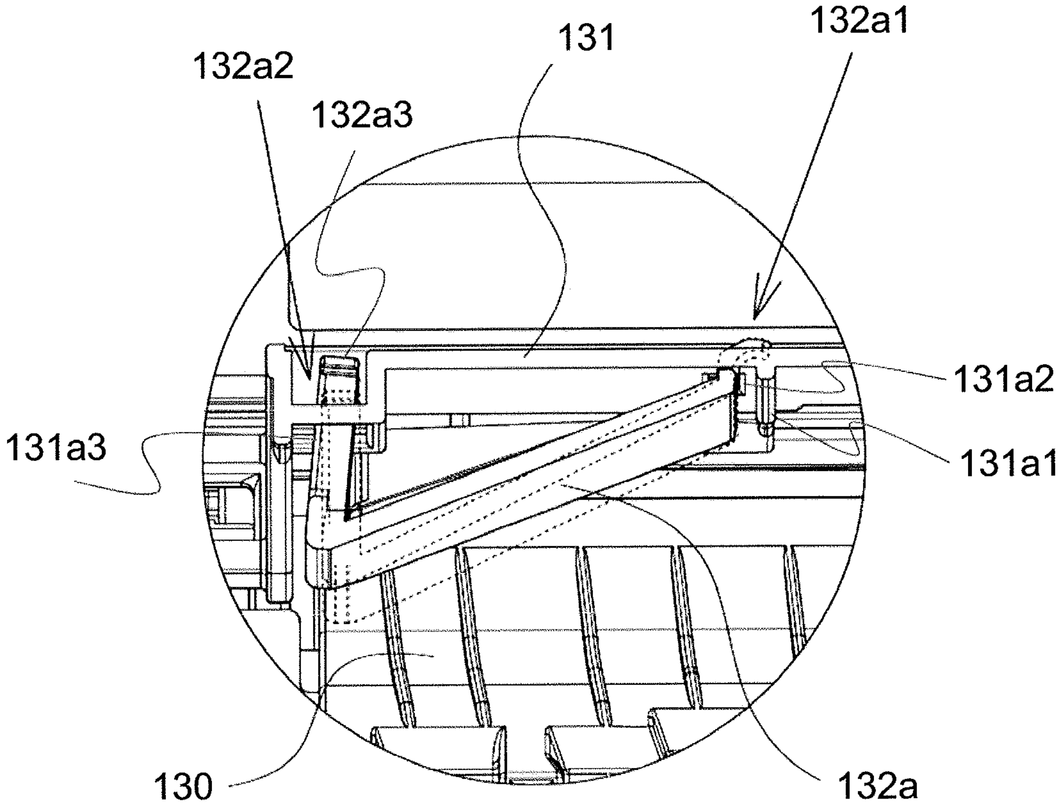

FIG. 11 is an illustration of a swingable guide.

Figure 12A:
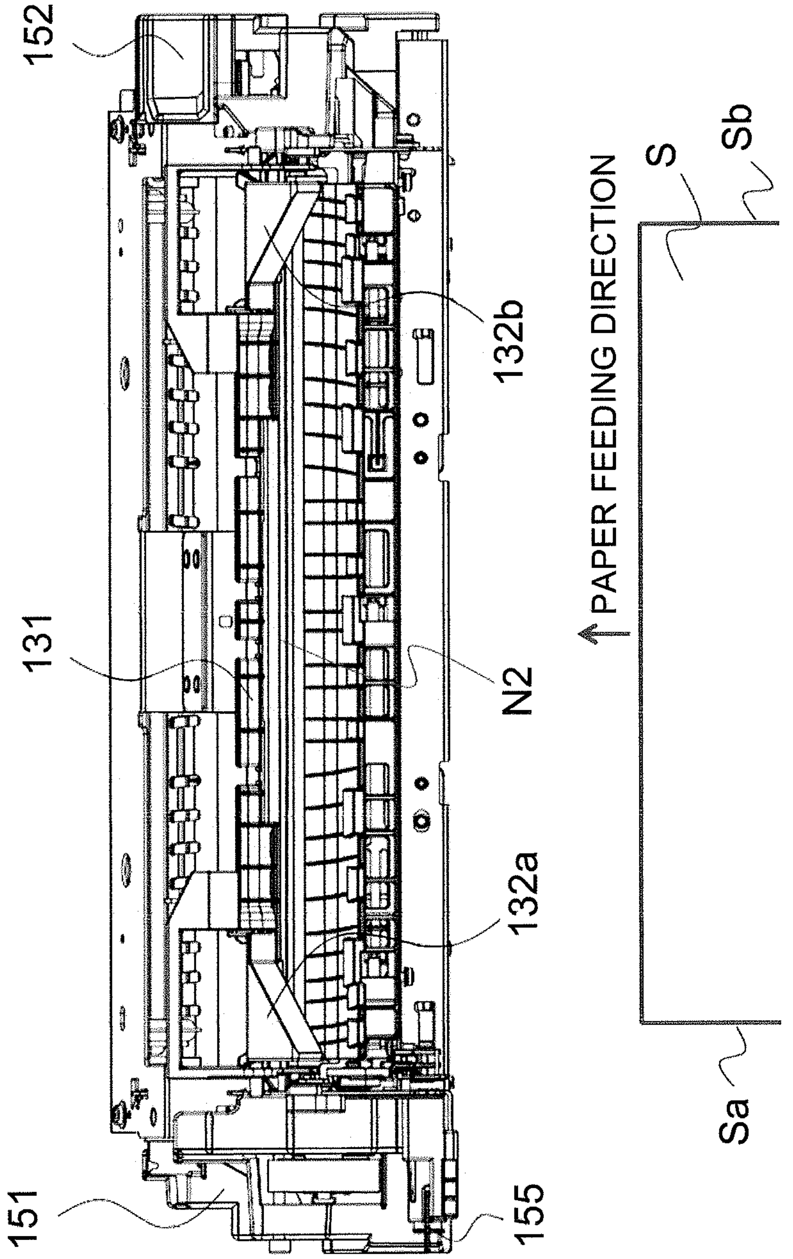
Figure 12B:
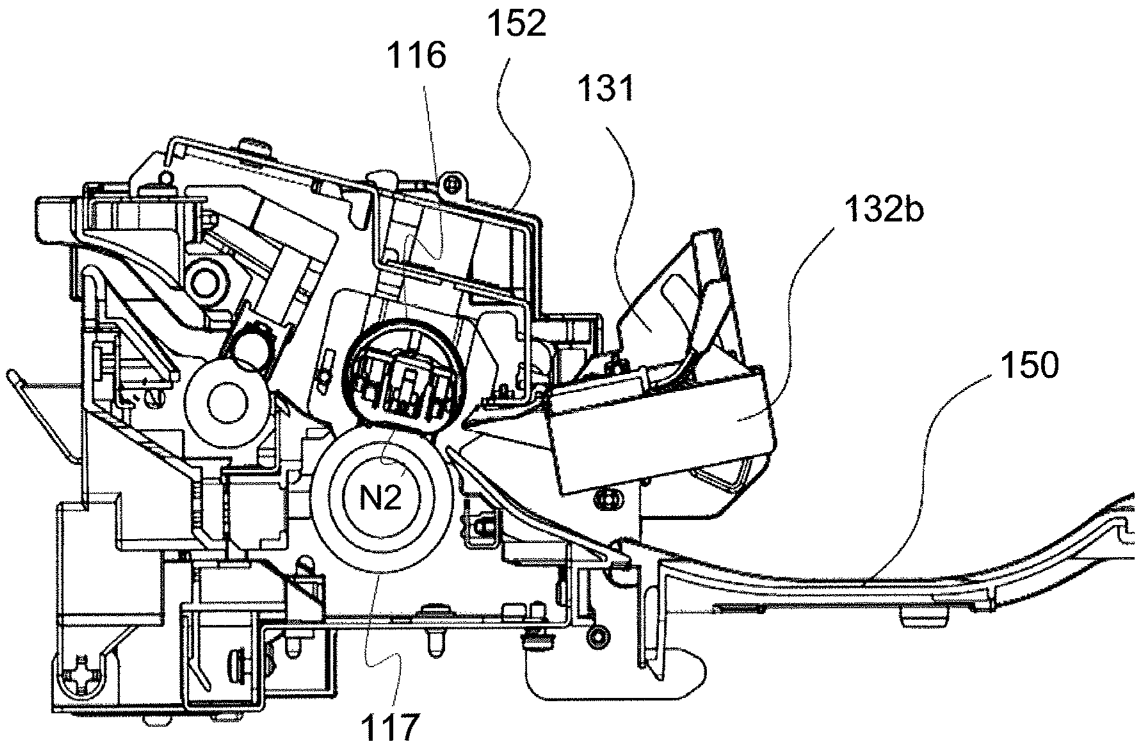
Figure 13A:
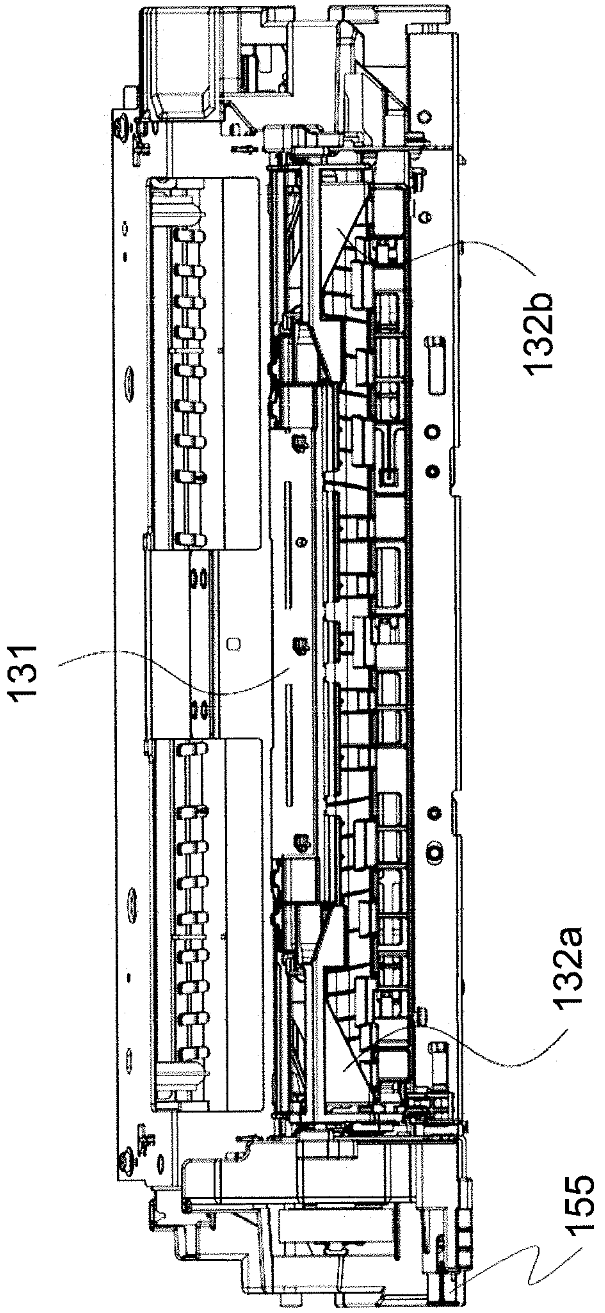
Figure 13B:
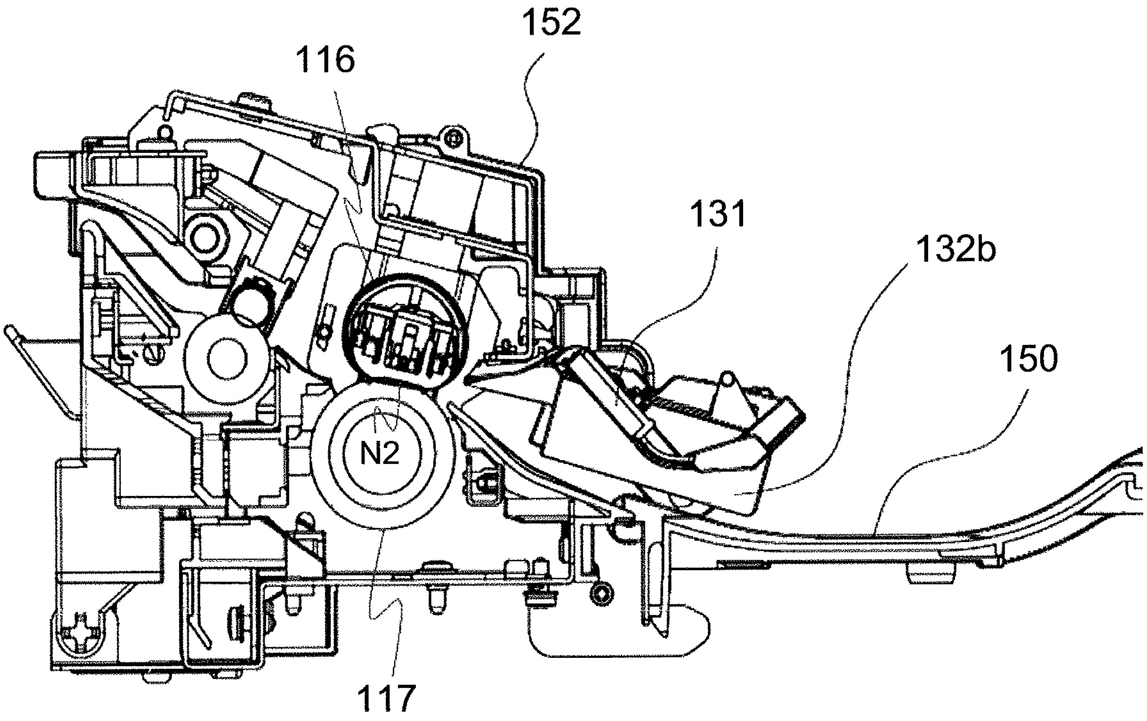
Figure 14:
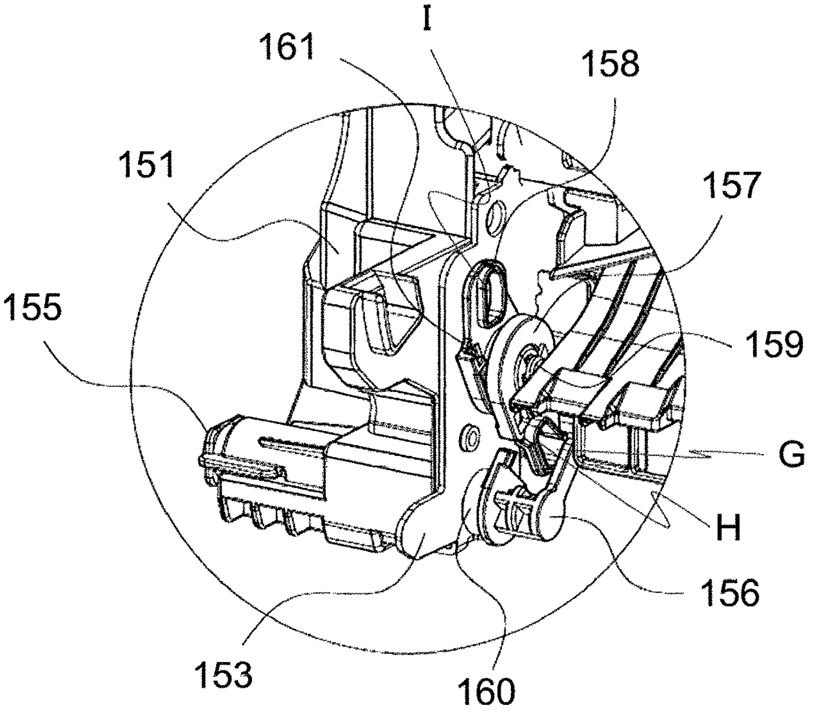
Figure 14:
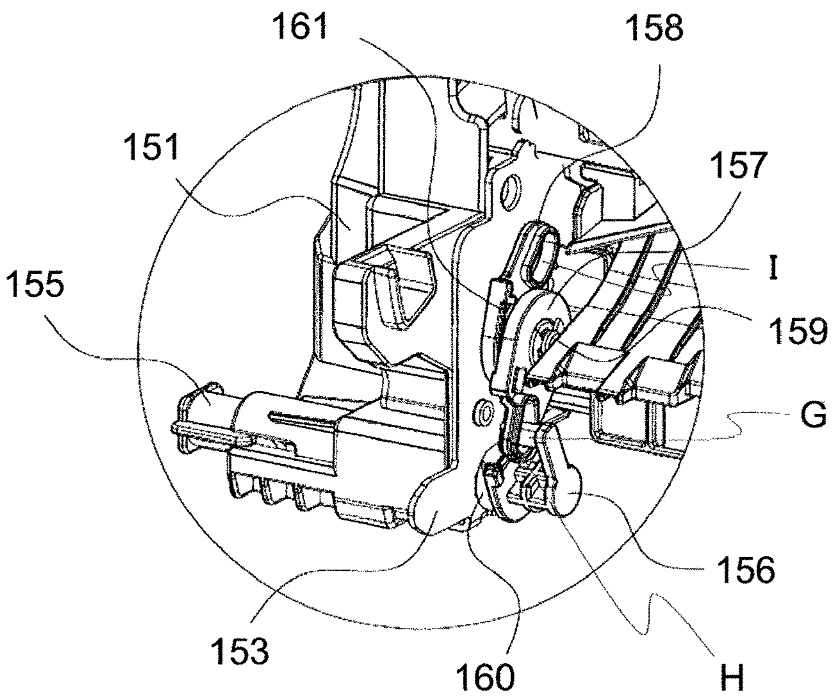

FIGS. 12A, 12B, 13A and 13B and (a) and (b) of FIG. 14 are illustrations each showing a fixing device according to Embodiment 4.

Figure 15:
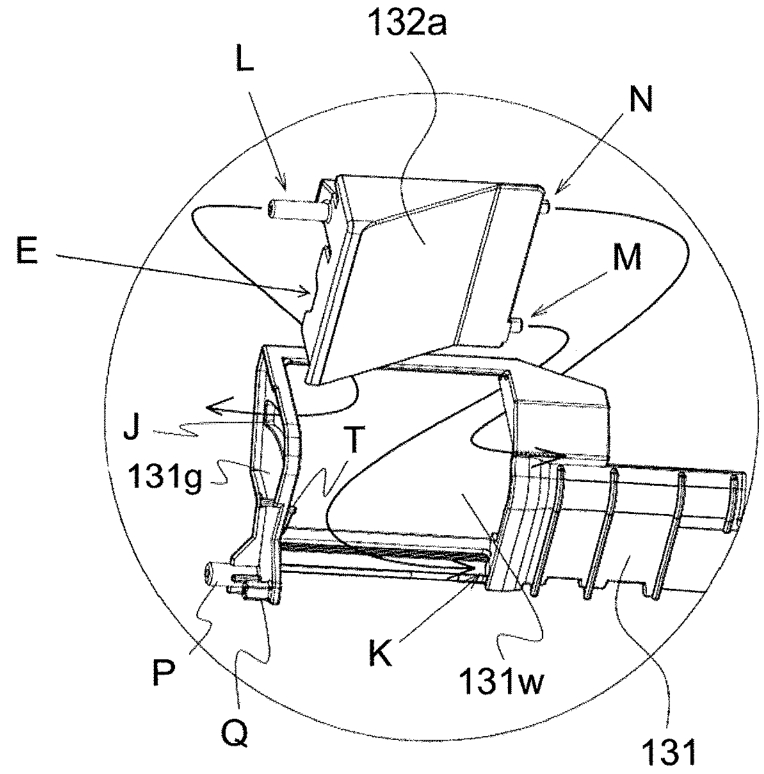
Figure 15:
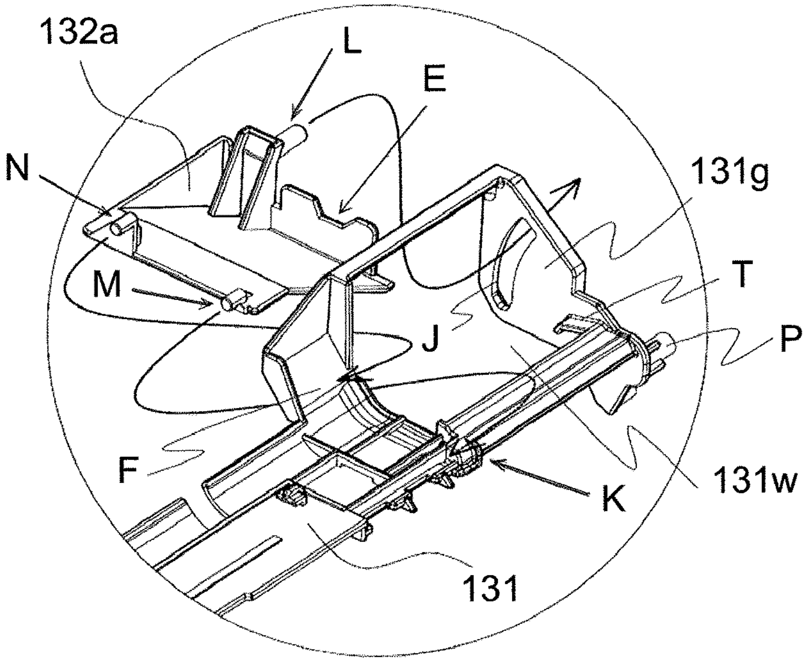
Figure 16A:
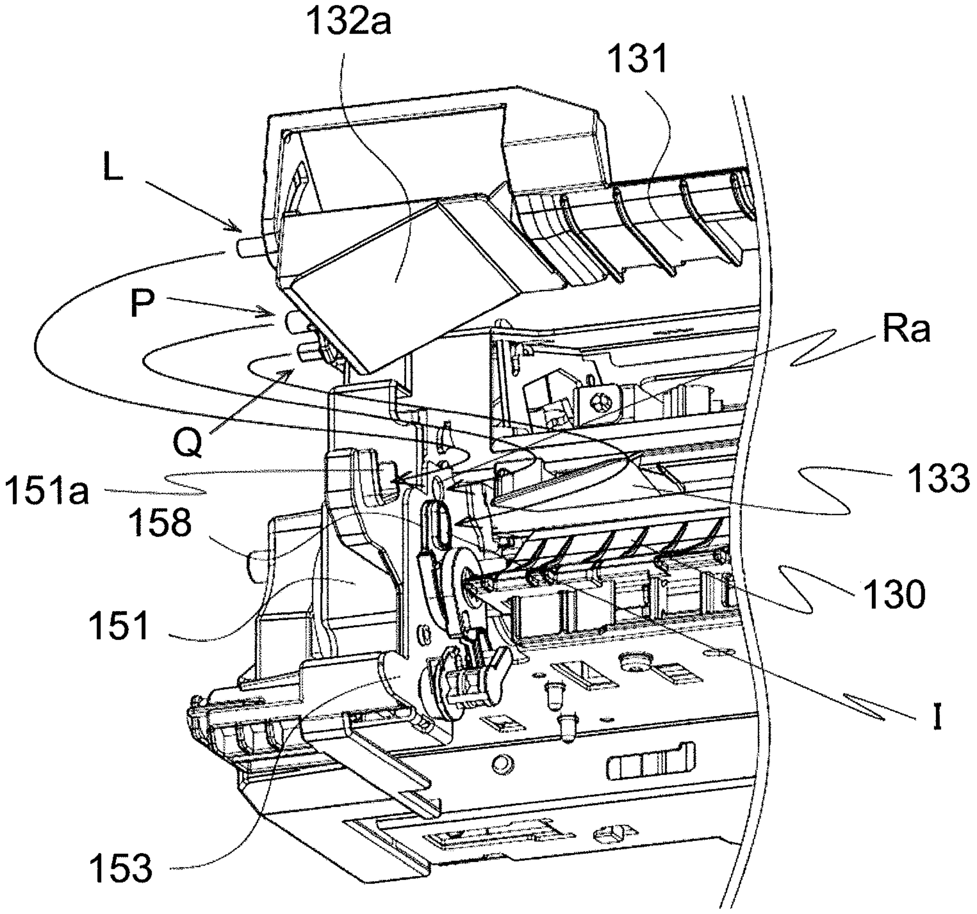
Figure 16B:
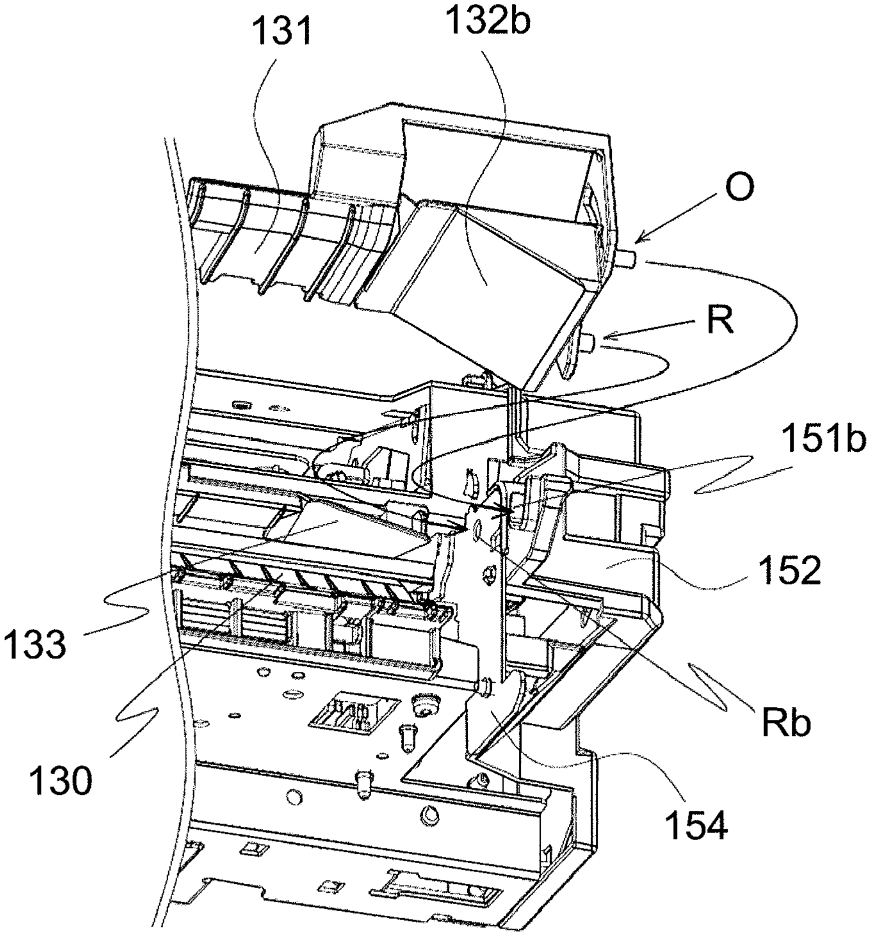

Parts (a) and (b) of FIG. 15 and FIGS. 16A and 16B are illustrations each showing assembling of the fixing device according to Embodiment 4.

Figure 17:
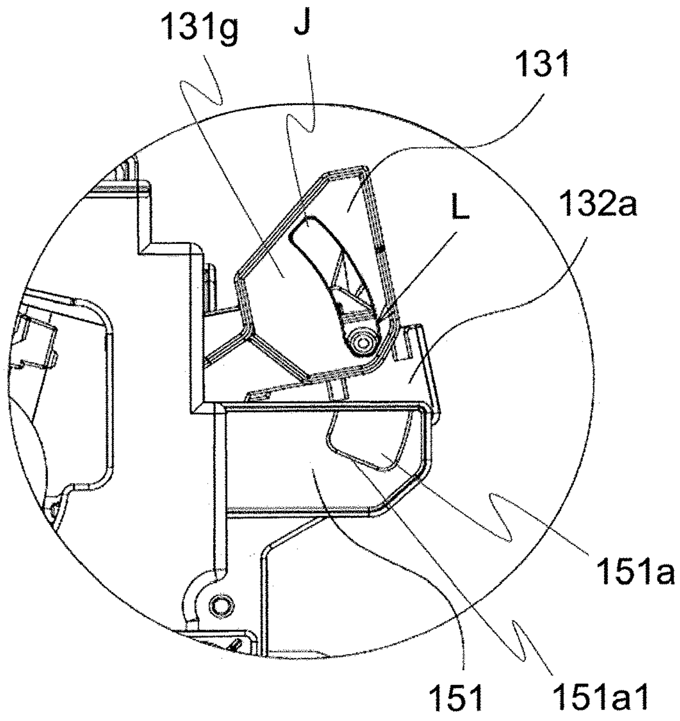
Figure 17:
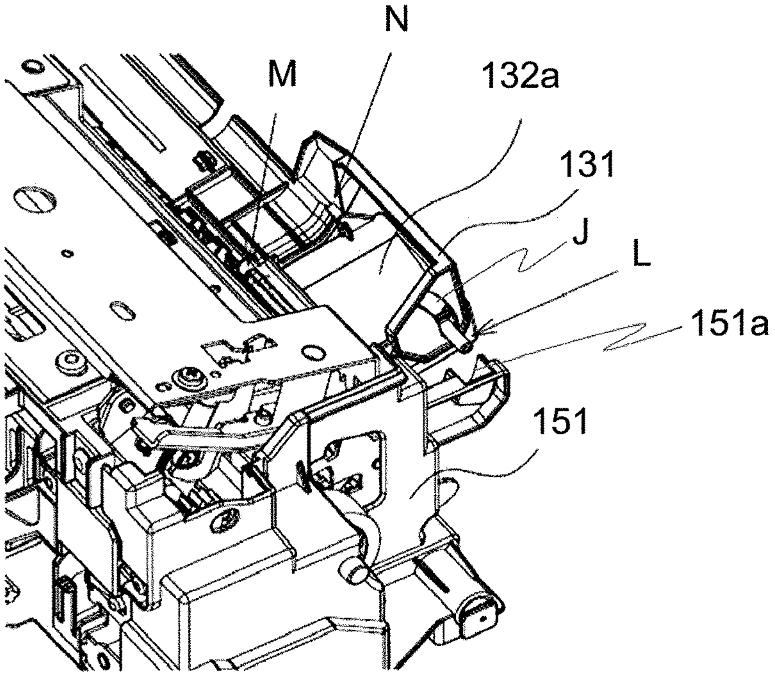
Figure 18:
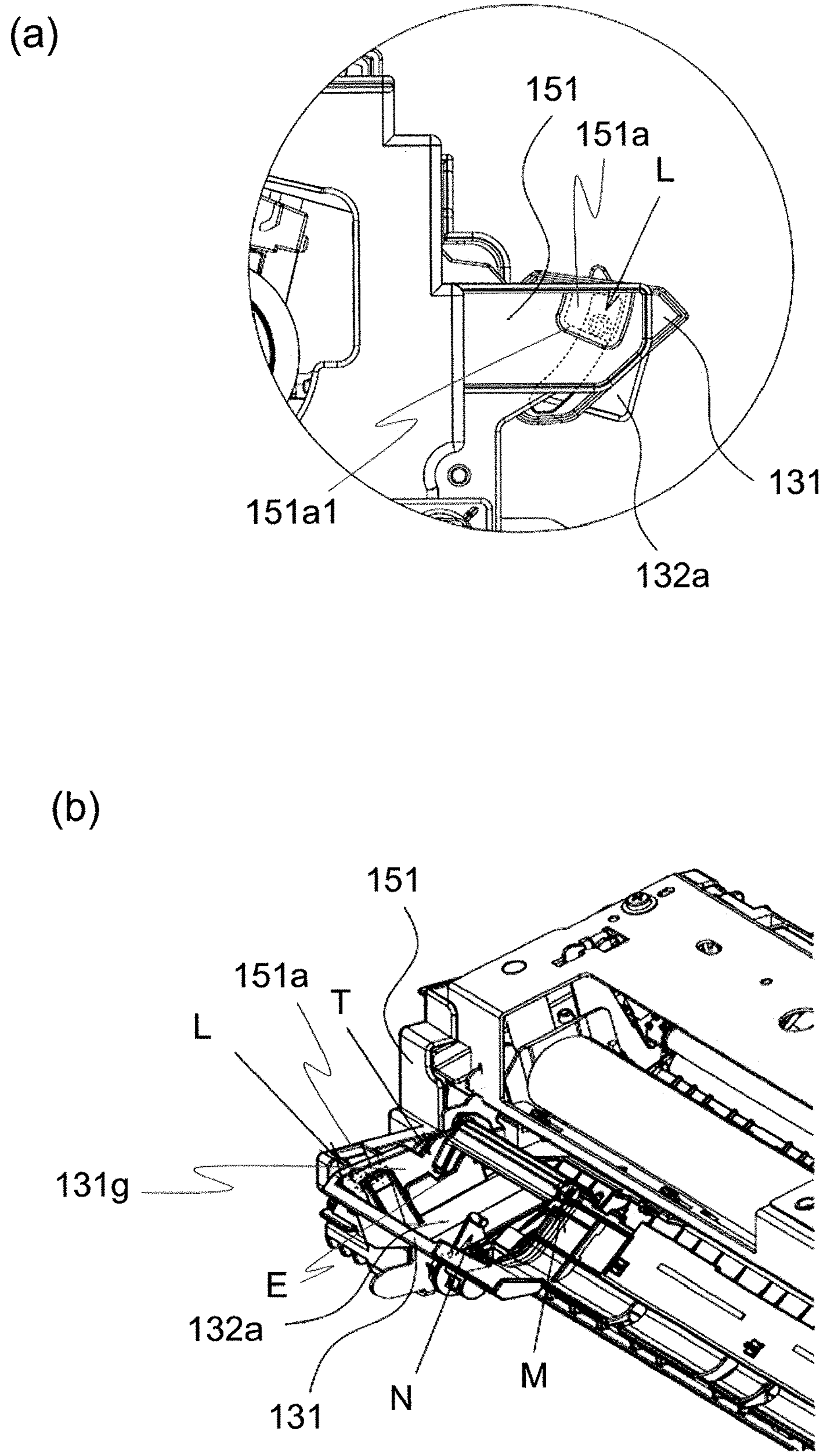

Parts (a) and (b) of FIG. 17 and (a) and (b) of FIG. 18 are illustrations each showing the fixing device according to Embodiment 4.

Figure 19:
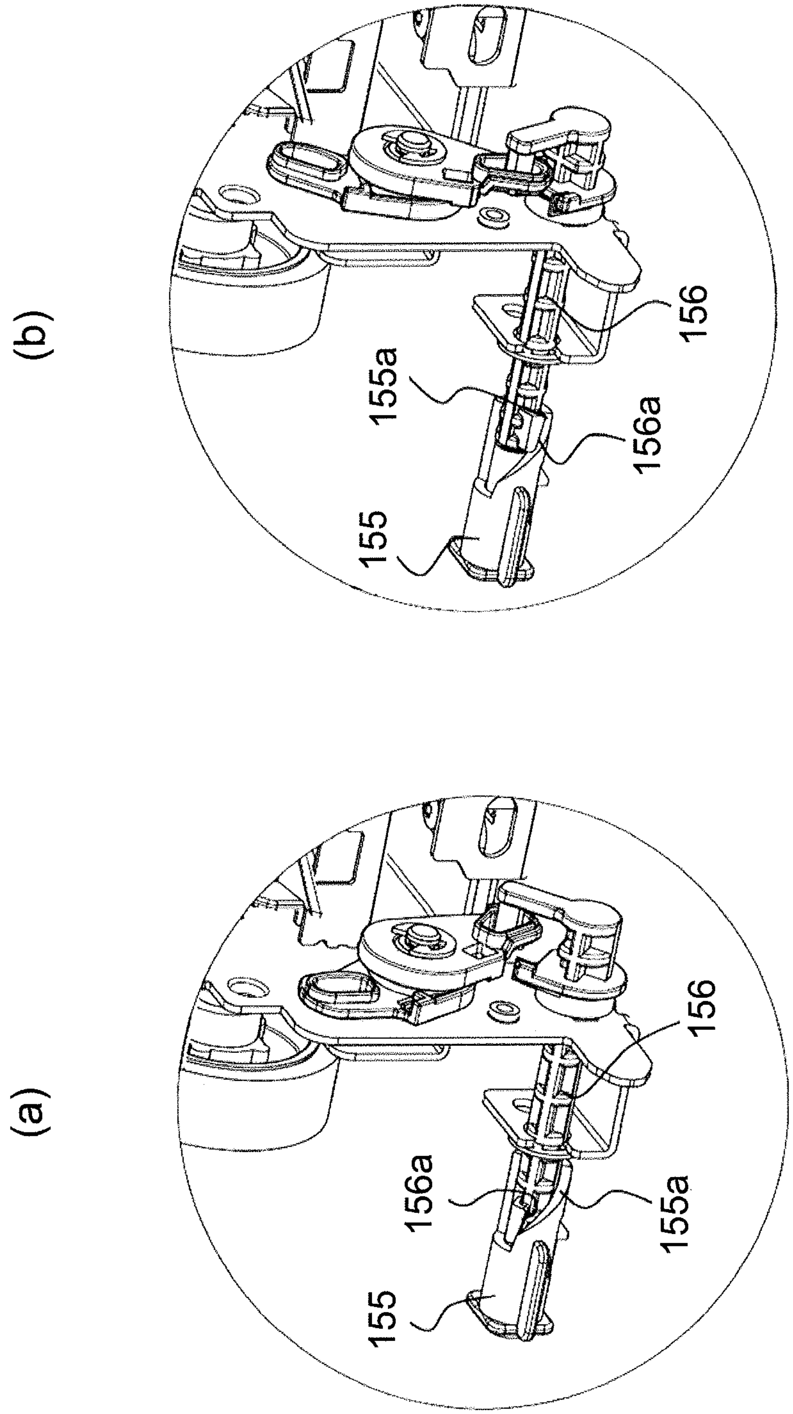

Parts (a) and (b) of FIG. 19 are illustrations each showing an openable button of an image forming apparatus according to Embodiment 4.

Figure 20:
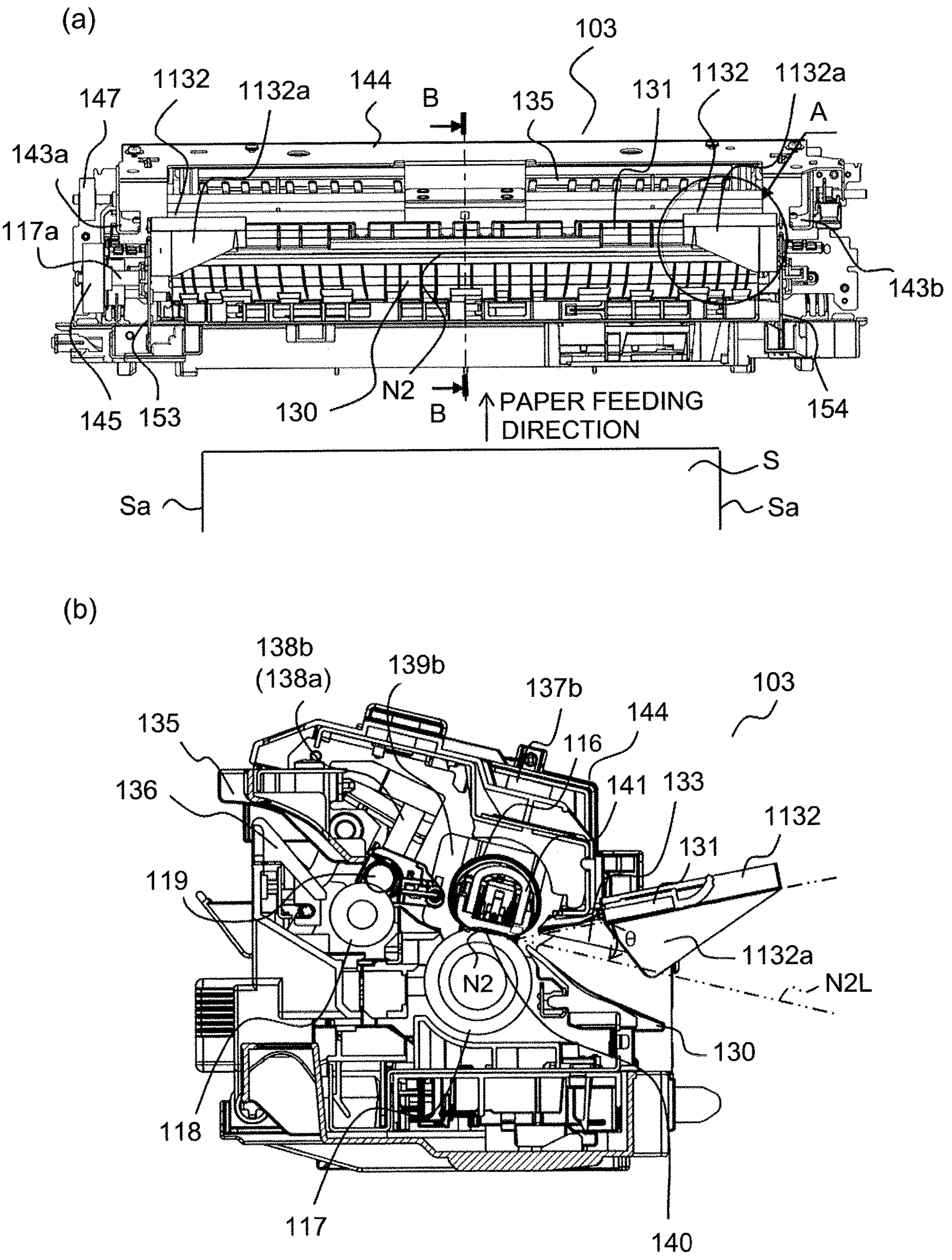

Parts (a) and (b) of FIG. 20 are illustrations each showing a fixing device according to Embodiment 5, in which (a) is a schematic view as seen from an upstream side of a recording paper feeding direction, and (b) is a sectional view.

Figure 21:
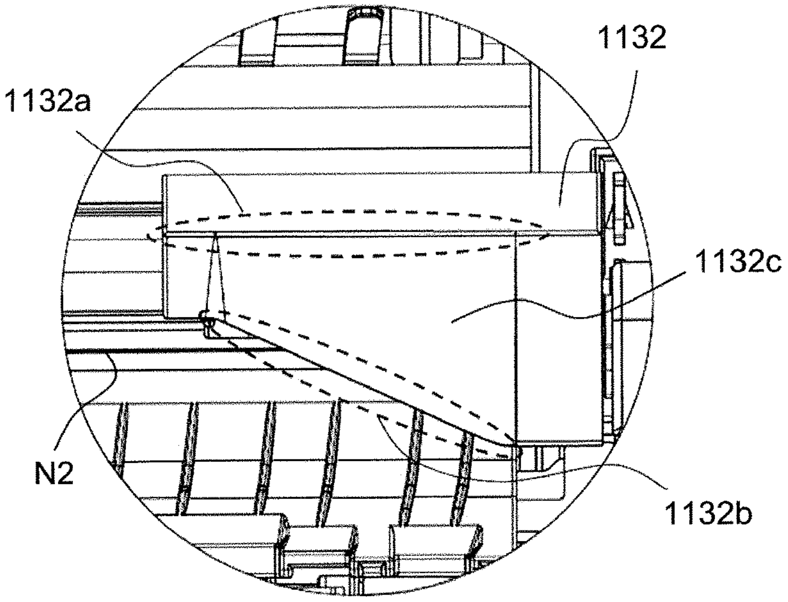

FIG. 21 is an illustration of an introducing guide.

Figure 22:
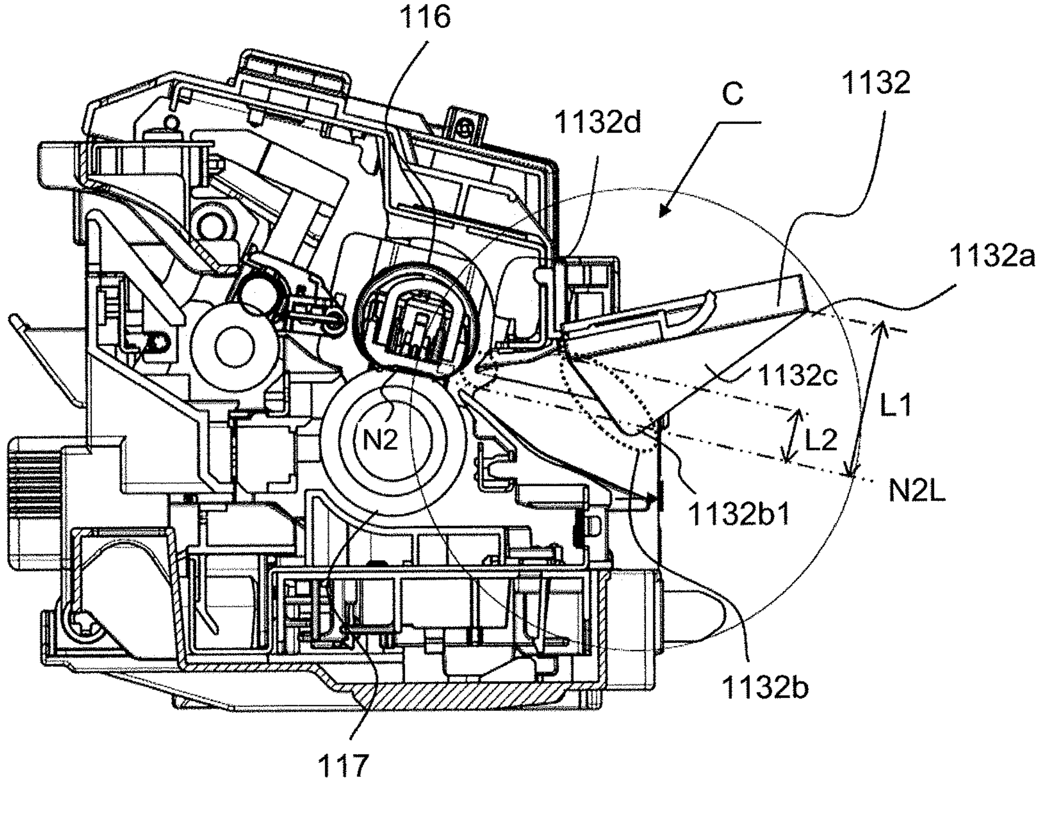

FIG. 22 is a sectional view taken along B-B line in (a) of FIG. 20.

Figure 23:
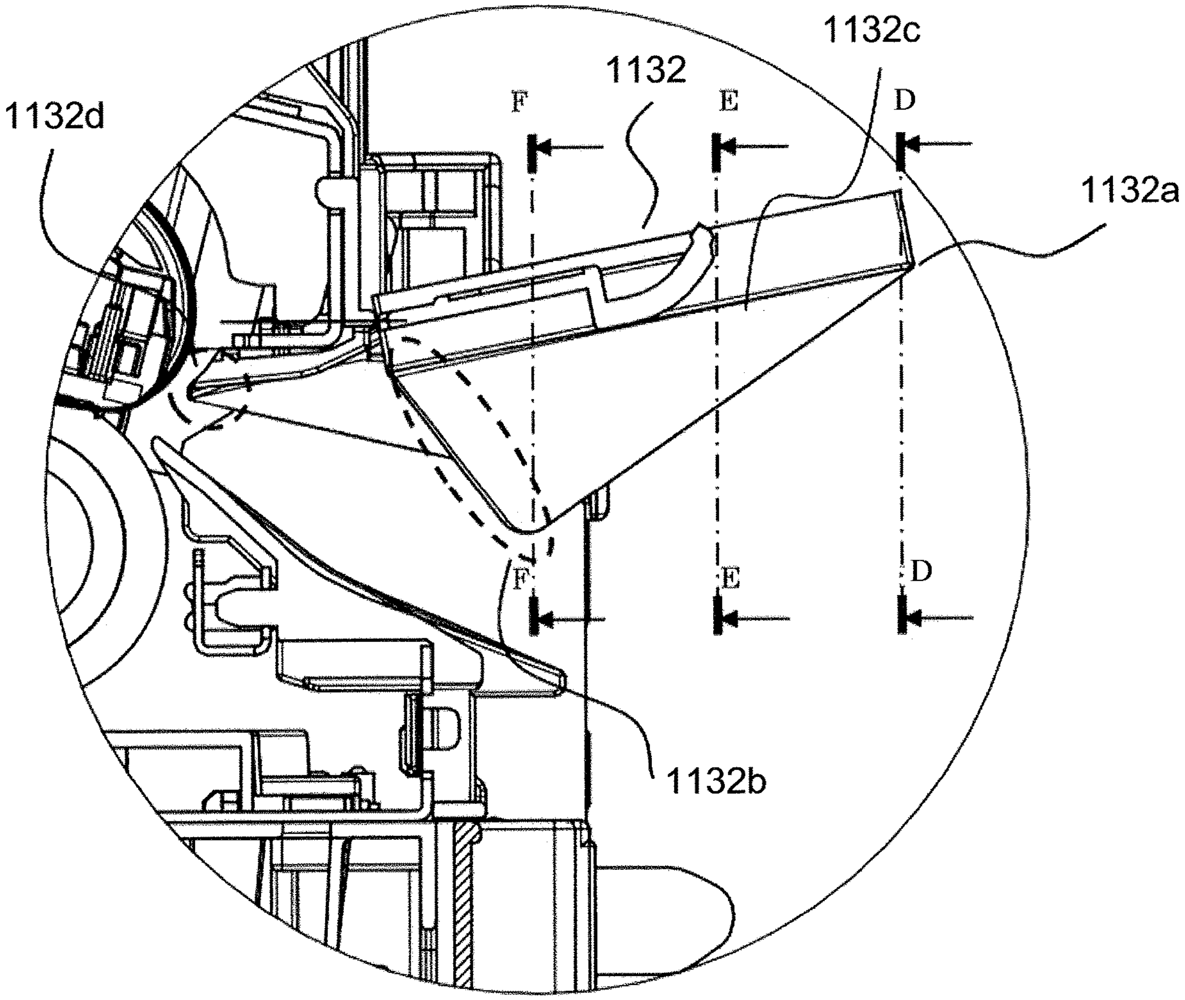

FIG. 23 is an enlarged view of portion C in FIG. 22.

Figure 24:
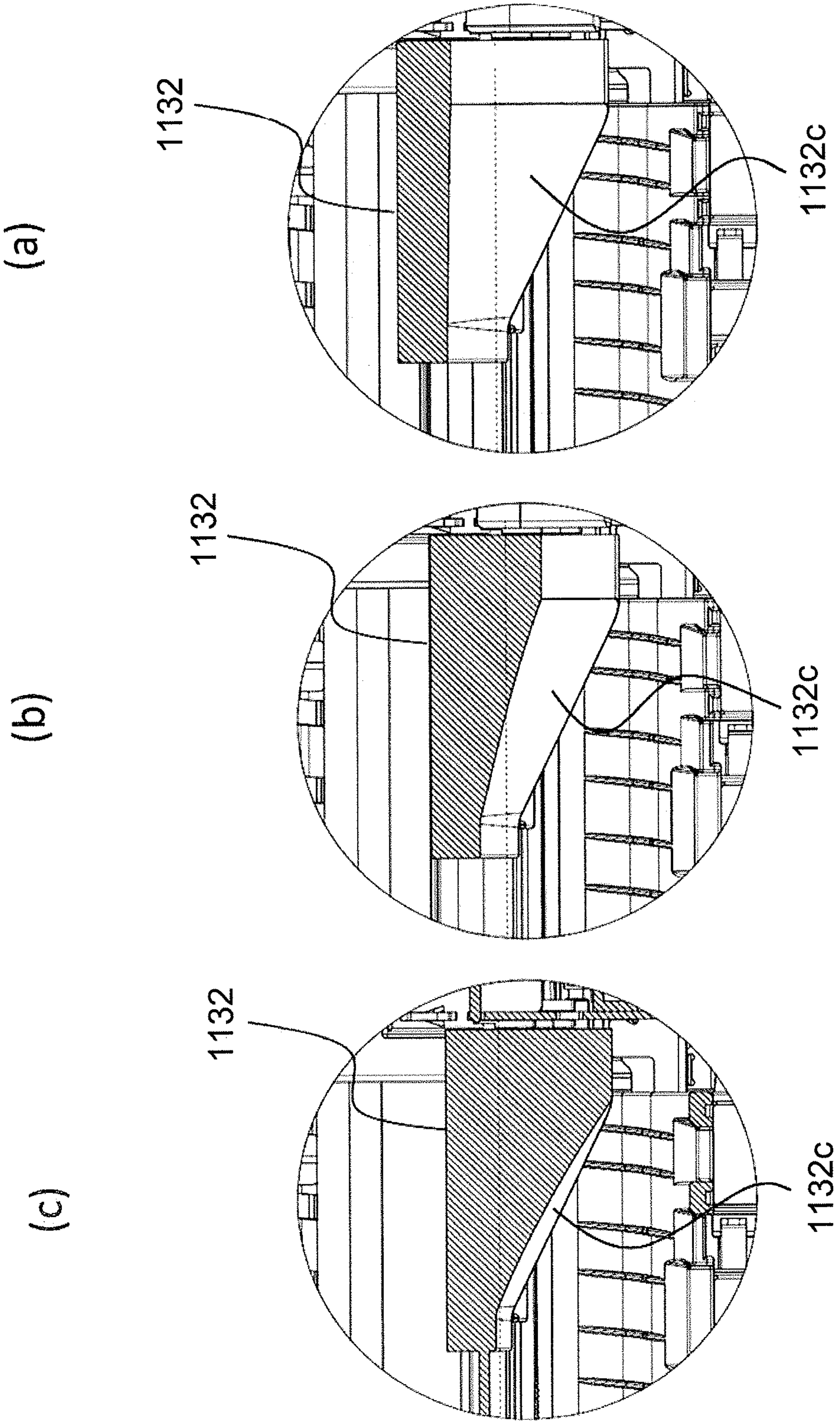

Parts (a) to (c) of FIG. 24 are sectional views showing a shape of the introducing guide.

Figure 25A:
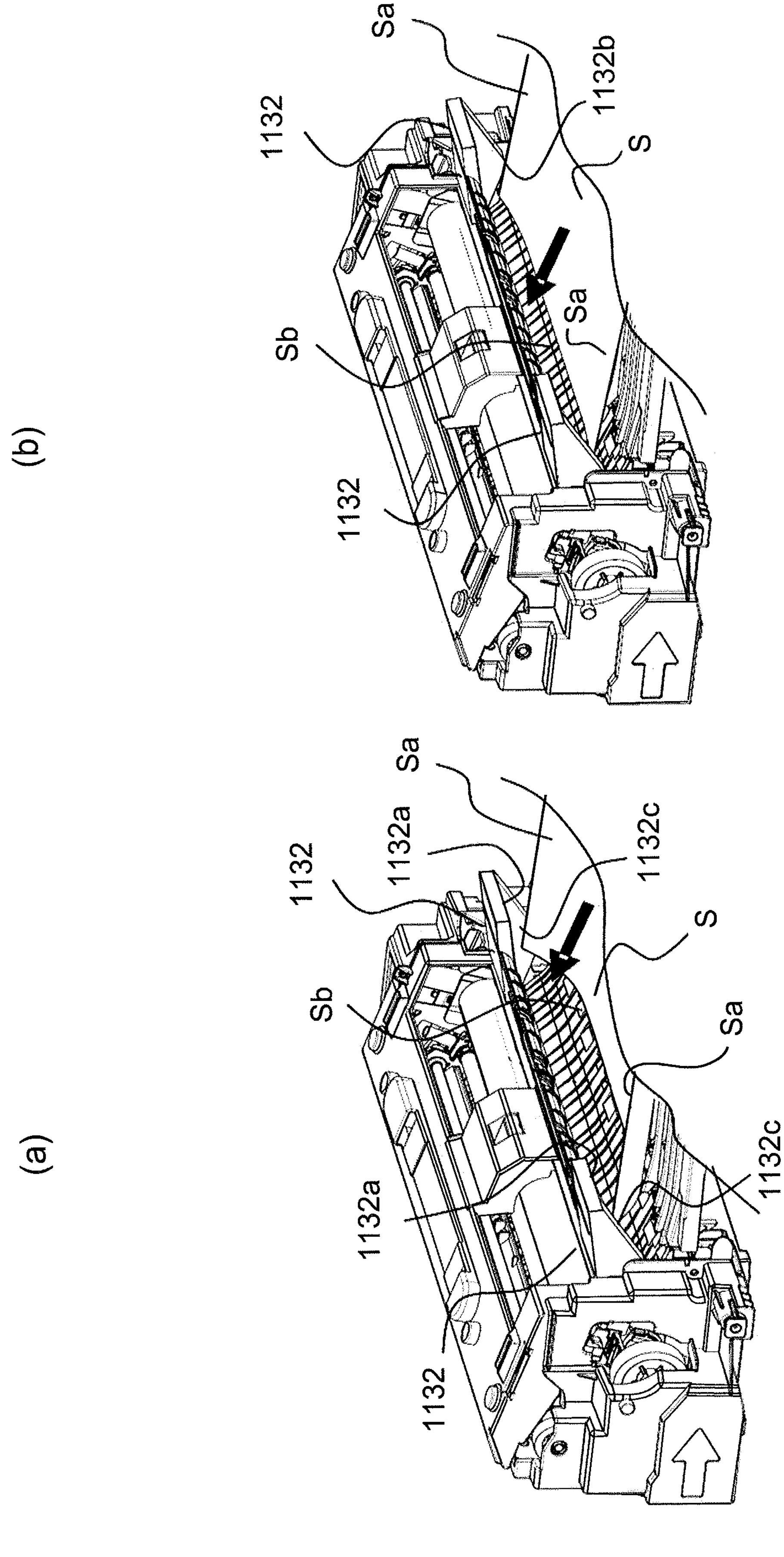
Figure 25B:
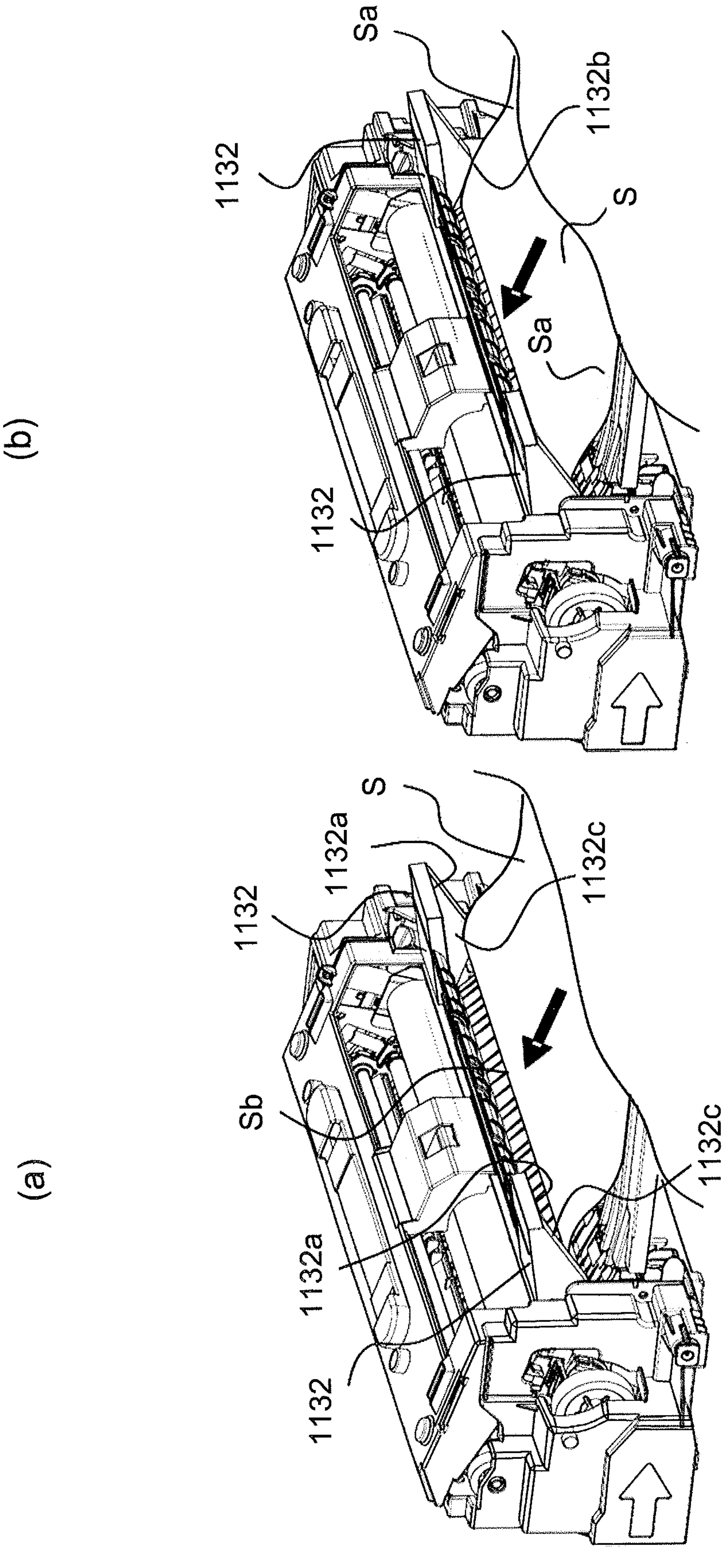
Figure 25C:
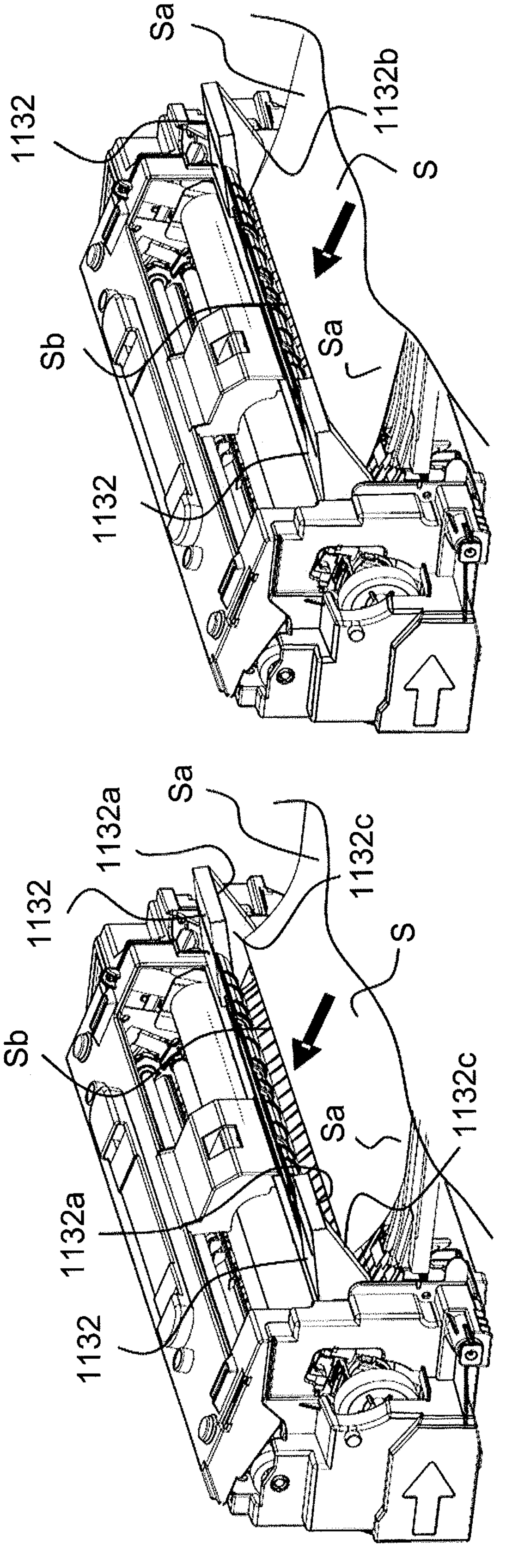

FIGS. 25A, 25B and 25C are illustrations showing a state in which curl of a leading end of the recording material is eliminated by the introducing guide.

Figure 26:
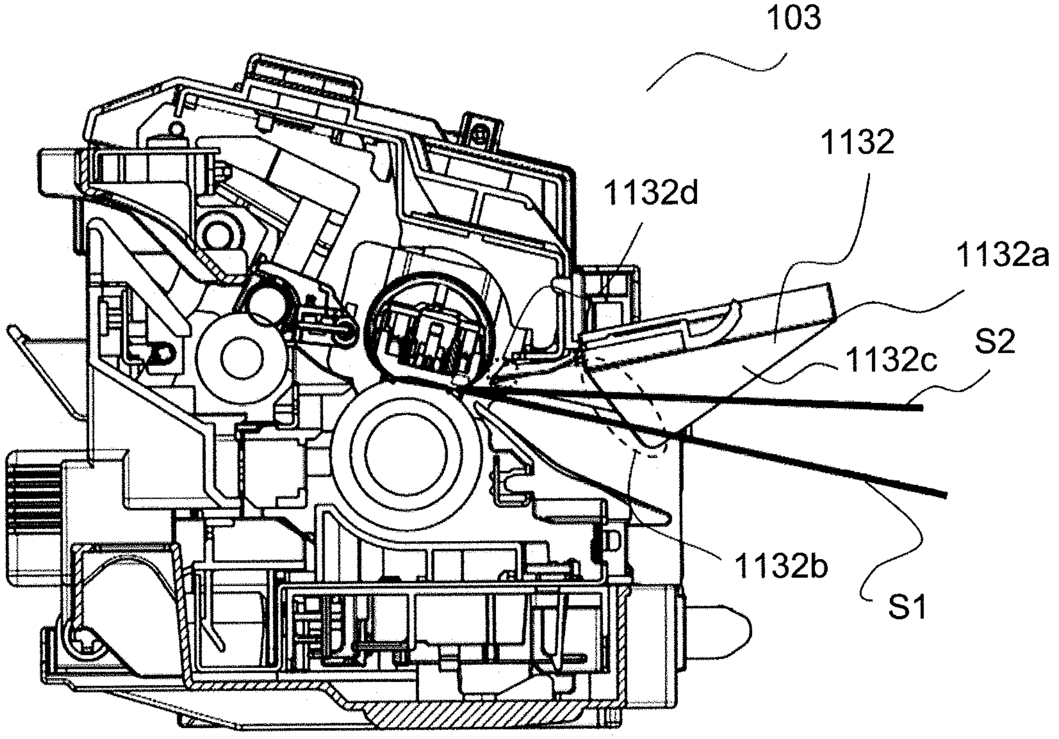

FIG. 26 is an illustration showing a state in which the recording material causes a trailing end leap.

Figure 27:
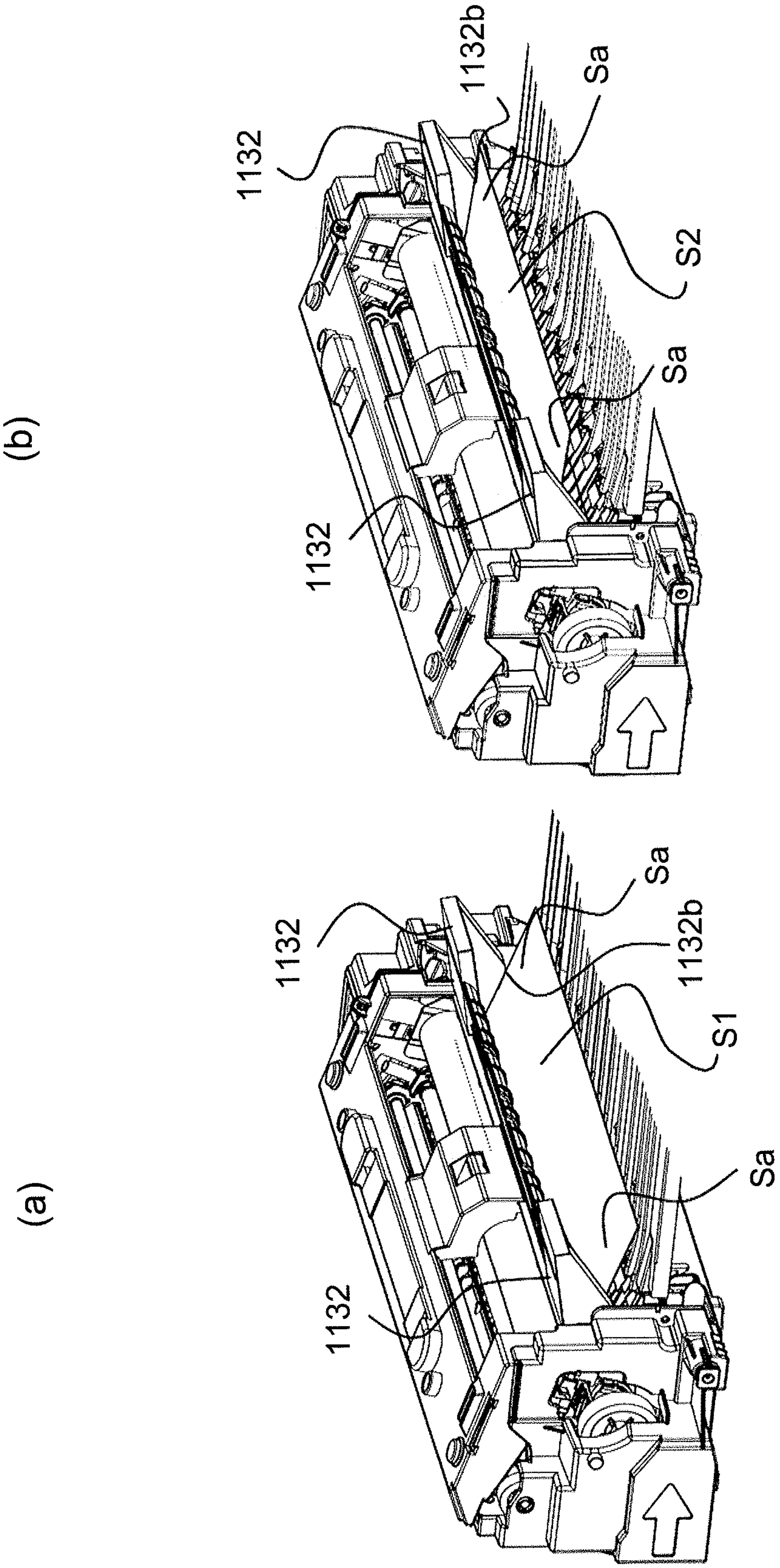

Parts (a) and (b) of FIG. 27 are illustrations showing a state in which the trailing end leap of the recording material is eliminated by the introducing guide.

Figure 28:
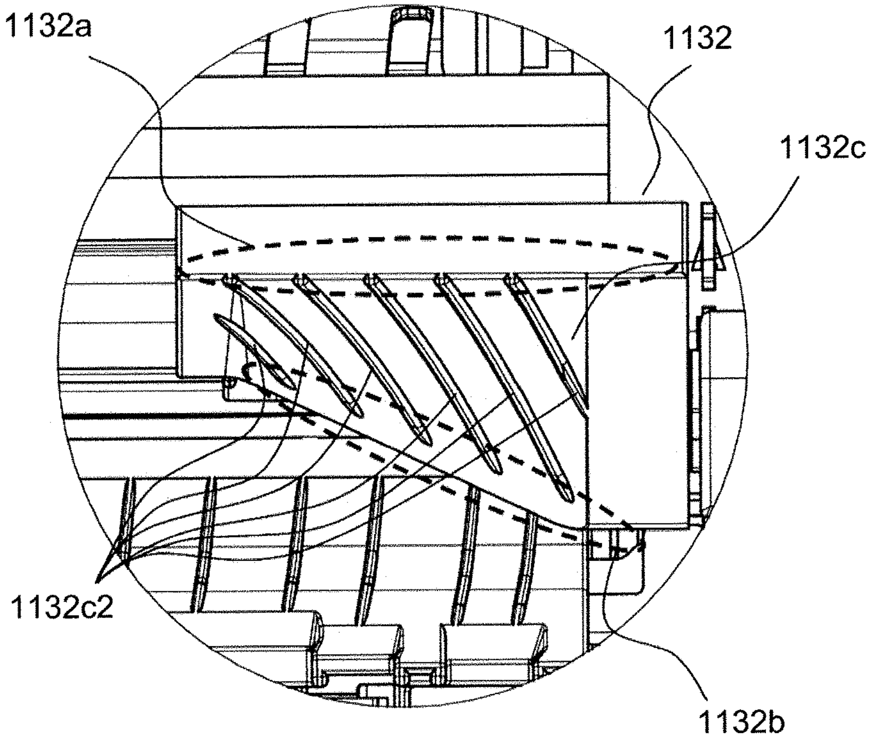
Figure 29:
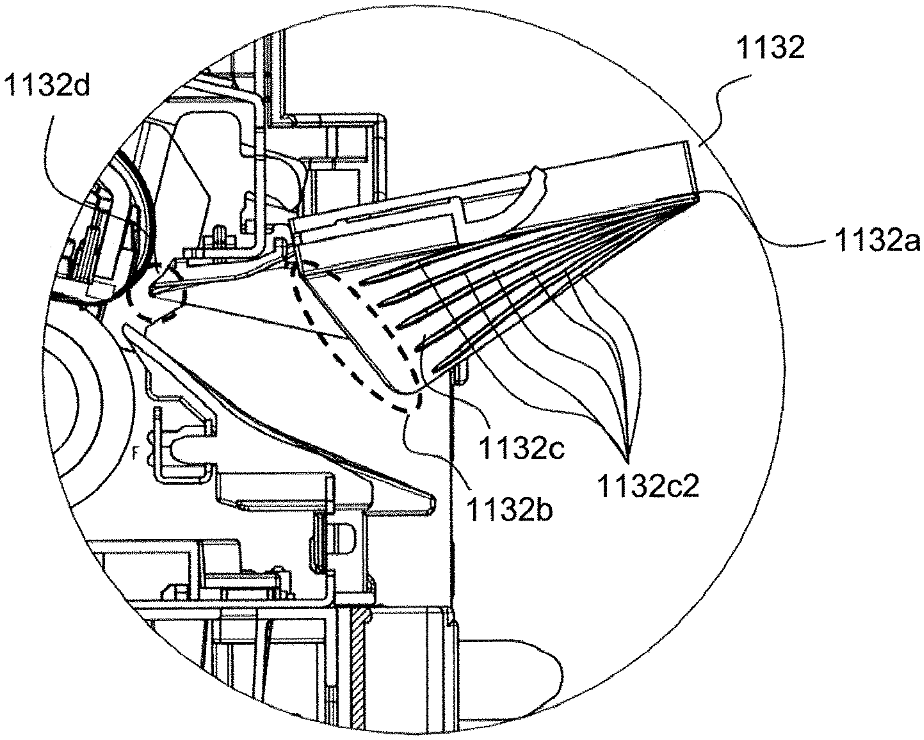

FIGS. 28 and 29 are illustrations each showing an introducing guide in Embodiment 6.

Figure 30:
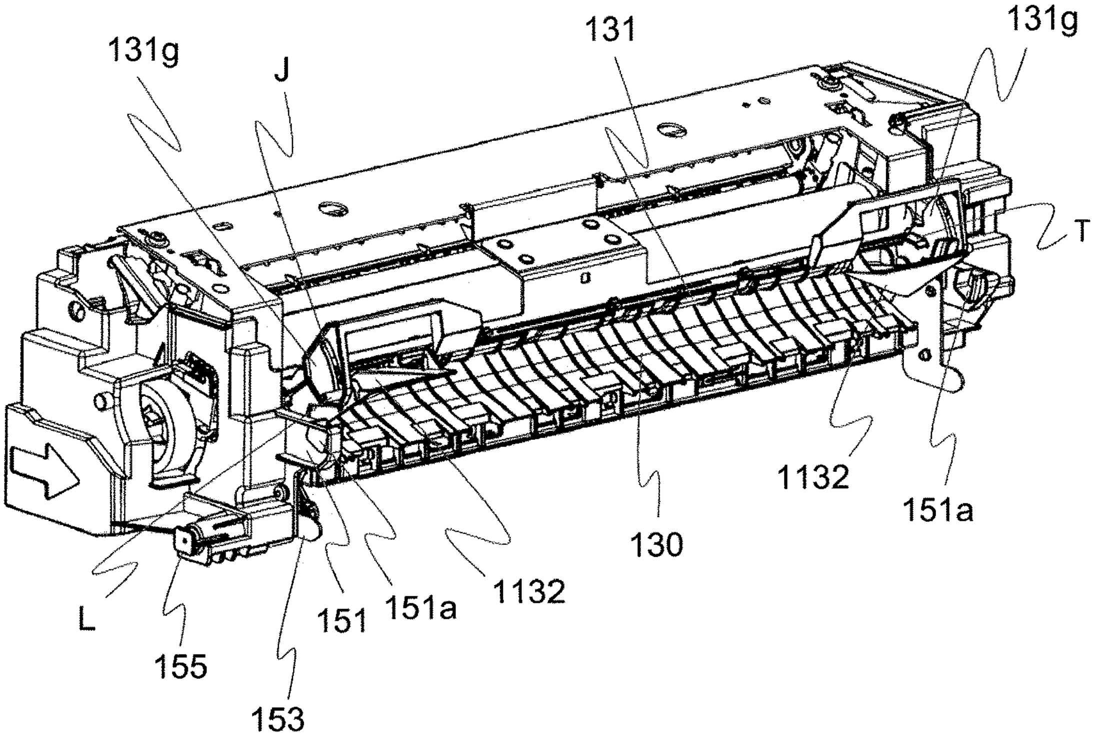

FIG. 30 is a perspective view of a fixing device in Embodiment 7.

Figure 31:
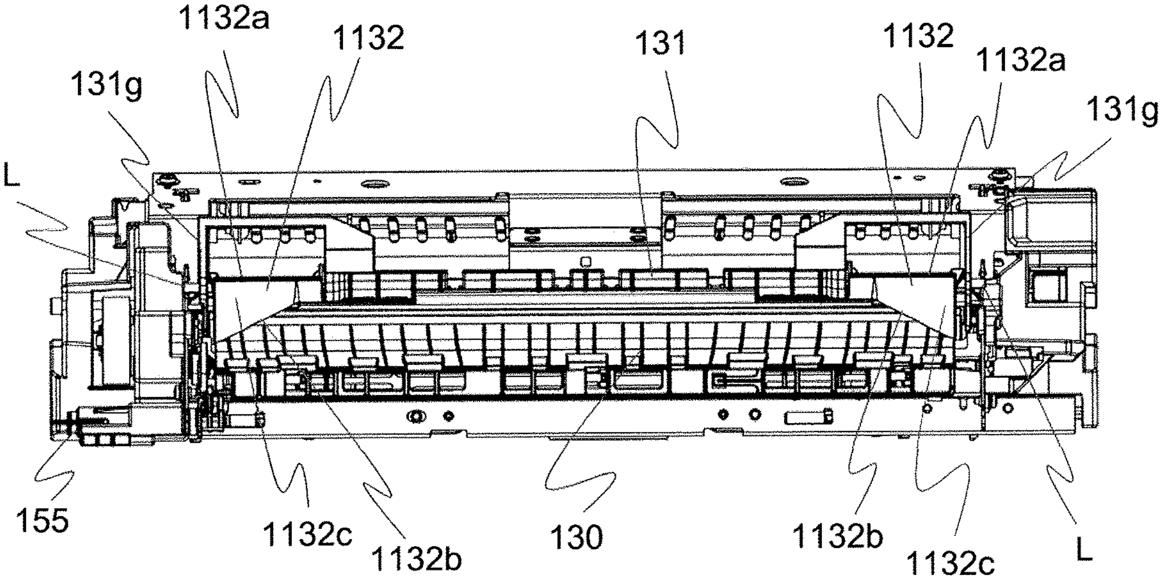

FIG. 31 is a schematic view of the fixing device in Embodiment 7 as seen from an upstream side of a recording paper feeding direction.

Figure 32:
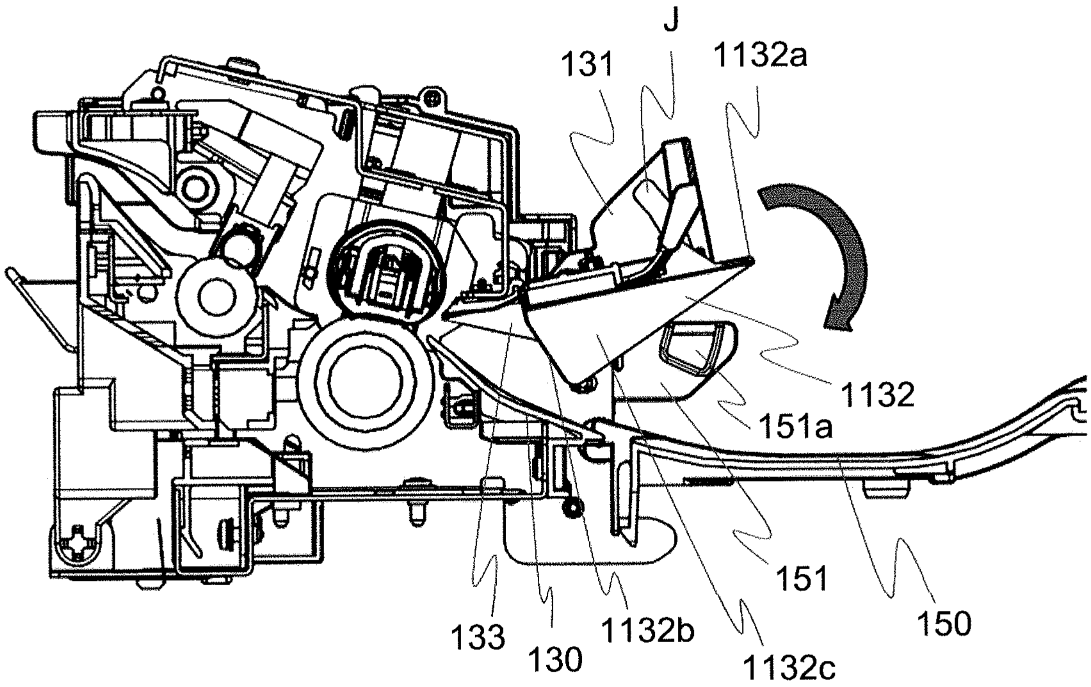

FIG. 32 is a sectional view of the fixing device in Embodiment 7.

DESCRIPTION OF THE EMBODIMENTS

Embodiments of the present invention will be described with reference to the drawings. However, with respect to dimensions, materials, shapes, relative positions of constituent elements described in the following embodiments, the present invention is not intended to be limited to those in the following embodiments unless otherwise specified. Although the following embodiments are preferred embodiments of the present invention, the present invention is not limited to the following embodiments, but within the scope of the present invention, various constitutions can be replaced with other known constitutions.

Embodiment 1

(1) Image Forming Apparatus

An image forming apparatus is an apparatus for forming an image on a recording material such as plain paper or OHP sheet having various regular or irregular sizes (hereinafter referred to as recording paper) by an image forming process and then by outputting an image-formed product.

With respect to the image forming apparatus, a front (surface) side is a left side when an image forming apparatus main assembly is seen from an upstream side of a recording paper feeding direction at a transfer nip of an image forming portion. A rear (surface) side is a right side when the image forming apparatus main assembly is seen from the upstream side of the recording paper feeding direction at the transfer nip of the image forming portion.

Figure 1:
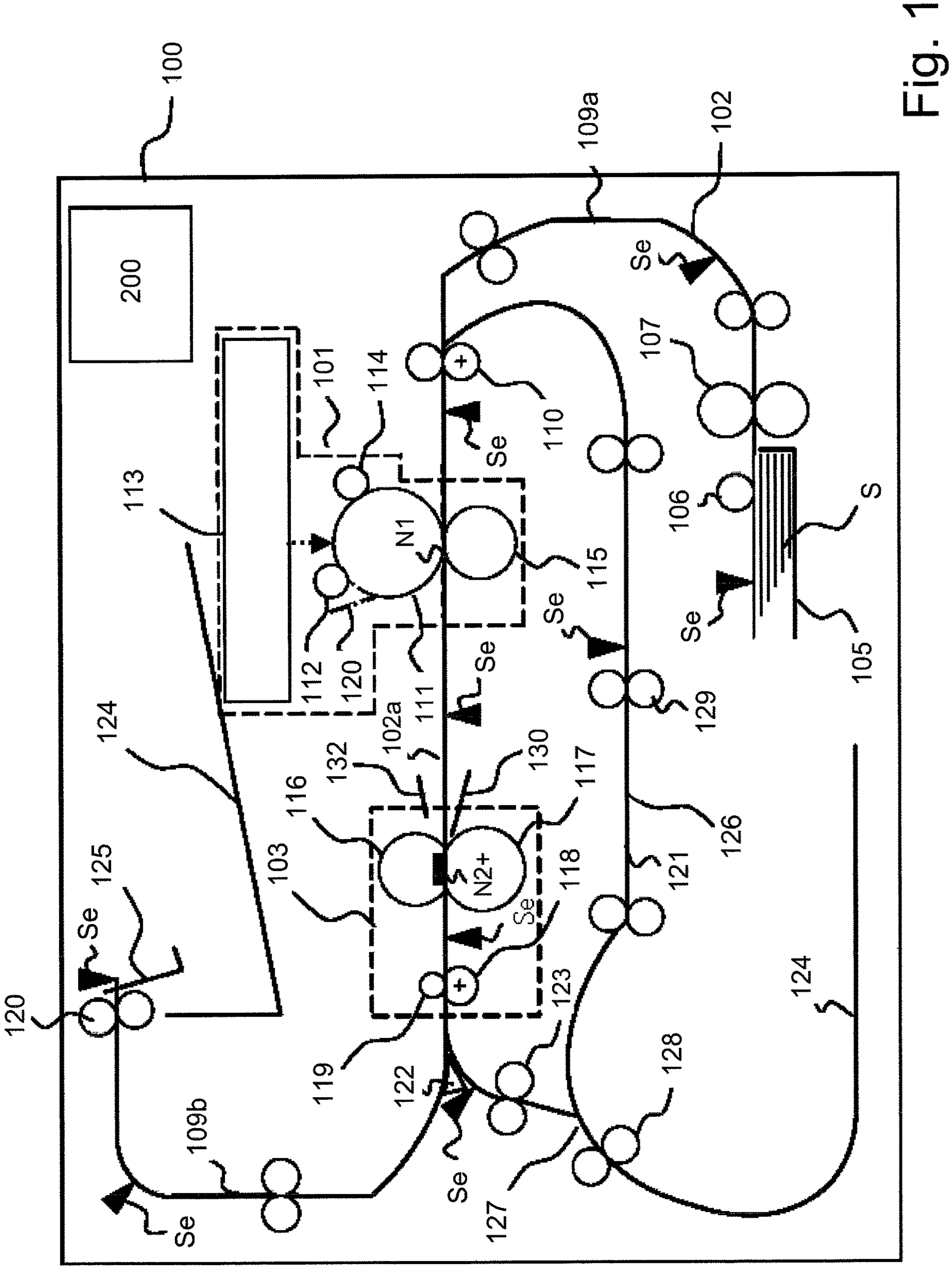
FIG. 1 is an illustration of an image forming apparatus.

FIG. 1 is a schematic structural view as seen from the front (surface) side of the image forming apparatus in this embodiment as an example of the present invention. This image forming apparatus is a monochromatic digital printer of an electrophotographic type.

In FIG. 1, the image forming apparatus includes an image forming apparatus main assembly 100 constituting a casing thereof. Inside the apparatus main assembly 100, an image forming portion 101 for forming a toner image (image) on a recording paper S and a fixing portion (fixing device) 103 for fixing, on the recording paper S the (unfixed) toner image (image) formed on the recording paper S are mounted.

A controller 200 is constituted by CPU and memories such as RAM and ROM, and an image forming sequence and various tables necessary to form the image are stored in the memories. The controller 200 executes the image forming sequence in accordance with a print instruction (command) outputted from an external device (not shown) such as a host computer.

The case where the controller executes the image forming sequence in accordance with a print instruction for effecting printing on one side (surface) of the recording paper will be described. In the image forming portion 101, first, a drum type electrophotographic photosensitive member (hereinafter referred to as a photosensitive drum) 111 as an image bearing member is rotated at a recording paper peripheral speed (process speed). Then, an outer peripheral surface of the photosensitive drum 111 is electrically charged to a predetermined potential and a predetermined polarity by a charging roller (charging means) 112 (charging step).

Next, the charged surface of the photosensitive drum 111 is subjected to scanning exposure to a laser beam, modulation-controlled (ON/OFF-controlled) depending on image information from the external device, emitted from a laser beam scanner (exposure means) 113 (exposure step). As a result, an objective electrostatic latent image for the image information is formed on the surface of the photosensitive drum 111. The electrostatic latent image formed on the surface of the photosensitive drum 111 is developed with a toner by a developing device (developing means) 114 to be visualized as the toner image (developing step).

On the other hand, sheets of the recording paper S accommodated in a feeding cassette 104 are fed one by one at predetermined feeding timing by rotation of a pick-up roller 106 in a recording paper feeding portion 102. The recording paper S is fed to a registration roller 110 via a feeding guide 109*a* by rotation of a sheet (paper) feeding roller 107. The registration roller 110 rotates at predetermined timing to feed the recording paper S into a transfer nip N1 formed by the surface of the photosensitive drum 111 and an outer peripheral surface of a transfer roller (transfer means) 115. The recording paper S is nipped and fed by the surface of the photosensitive drum 111 and the surface of the transfer roller 115. In this feeding process, a predetermined transfer bias is applied to the transfer roller 115, so that the toner image on the surface of the photosensitive drum 111 is transferred onto the recording paper S (transfer step).

The recording paper S on which the (unfixed) toner image is carried in introduced into a fixing nip N2 of the fixing device 103. Then, at the fixing nip N2, heat and pressure are applied to the (unfixed) toner image, so that the toner image is heated and fixed on the recording paper S. A constitution of the fixing device 103 will be specifically described later in (2).

The recording paper S coming out of the fixing device 103 is discharged onto a print stacking portion 124, provided outside the apparatus main assembly 100, by rotation of a discharging guide 109*b* and a discharging roller 120.

A full-load detecting lever 125 for detecting full load of the recording paper S stacked (loaded) on the print stacking portion 124. When the full load of the recording paper S is detected by the full-load detecting lever 125, the controller 200 controls the image forming portion 101 so as not to effect image formation on the recording paper S until the recording paper S until the recording paper S on the stacking portion 124 is removed.

The surface of the photosensitive drum 111 after the separation of the recording paper is cleaned by a cleaning blade 120 (cleaning step).

In the case where the controller 100 executes the image forming sequence in accordance with a print instruction to print the image on double sides of the recording paper S, the recording paper S coming out of the fixing device 103 is guided toward a roller 123 by a routing member 122 of a recording paper reverse feeding portion 126. The recording paper S is fed to a reverse portion 124 via a branch portion 127 by rotation of the roller 123 and a reversing roller 128. Then, a trailing end of the recording paper S passes through the branch portion 127, and thereafter the reversing roller 128 is rotated in an opposite direction to the previous rotational direction to feed the recording paper S from the trailing end side toward a feeding path 121 for re-feeding. As a result, the recording paper S is turned upside down, and then is fed in that state toward the registration roller 110 via the feeding path 121 by the rotation of a feeding roller 129.

The registration roller 110 sends the recording paper S into the transfer nip N1 of the image forming portion 101 at predetermined timing. At the image forming portion 101, the above-described steps of the charging, the exposure, the development and the transfer are performed, so that the (unfixed) toner image is formed on the recording paper S. Then, the recording paper S is introduced into the fixing nip N2 of the fixing device 103 and is subjected to application of heat and pressure at the fixing nip N2, so that the toner image is heated and fixed on the recording paper S. The recording paper S coming out of the fixing device 103 is discharged onto the print stacking portion 124 by the rotation of the intermediary feeding roller 109*b* and the discharging roller 120.

In FIG. 1, recording paper sensors S2 for detecting the recording paper S are provided in predetermined positions of the respective recording paper feeding paths along with the recording paper S in the feeding cassette 105 is fed.

(2) Fixing Device (Fixing Portion) 103

(2-1) General Structure of Fixing Device 103

Figure 2:
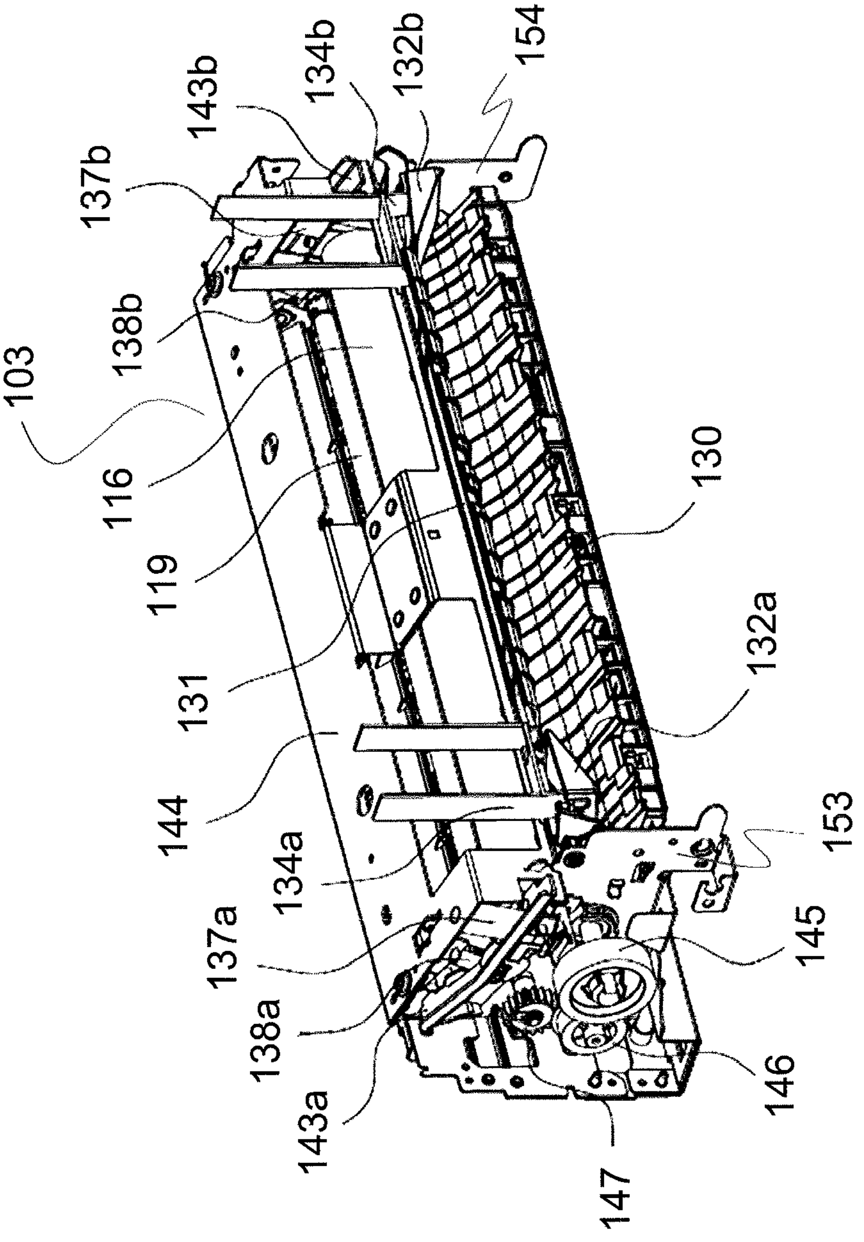
FIG. 2 is a perspective view of a fixing device (apparatus) according to Embodiment 1.
Figure 3A:
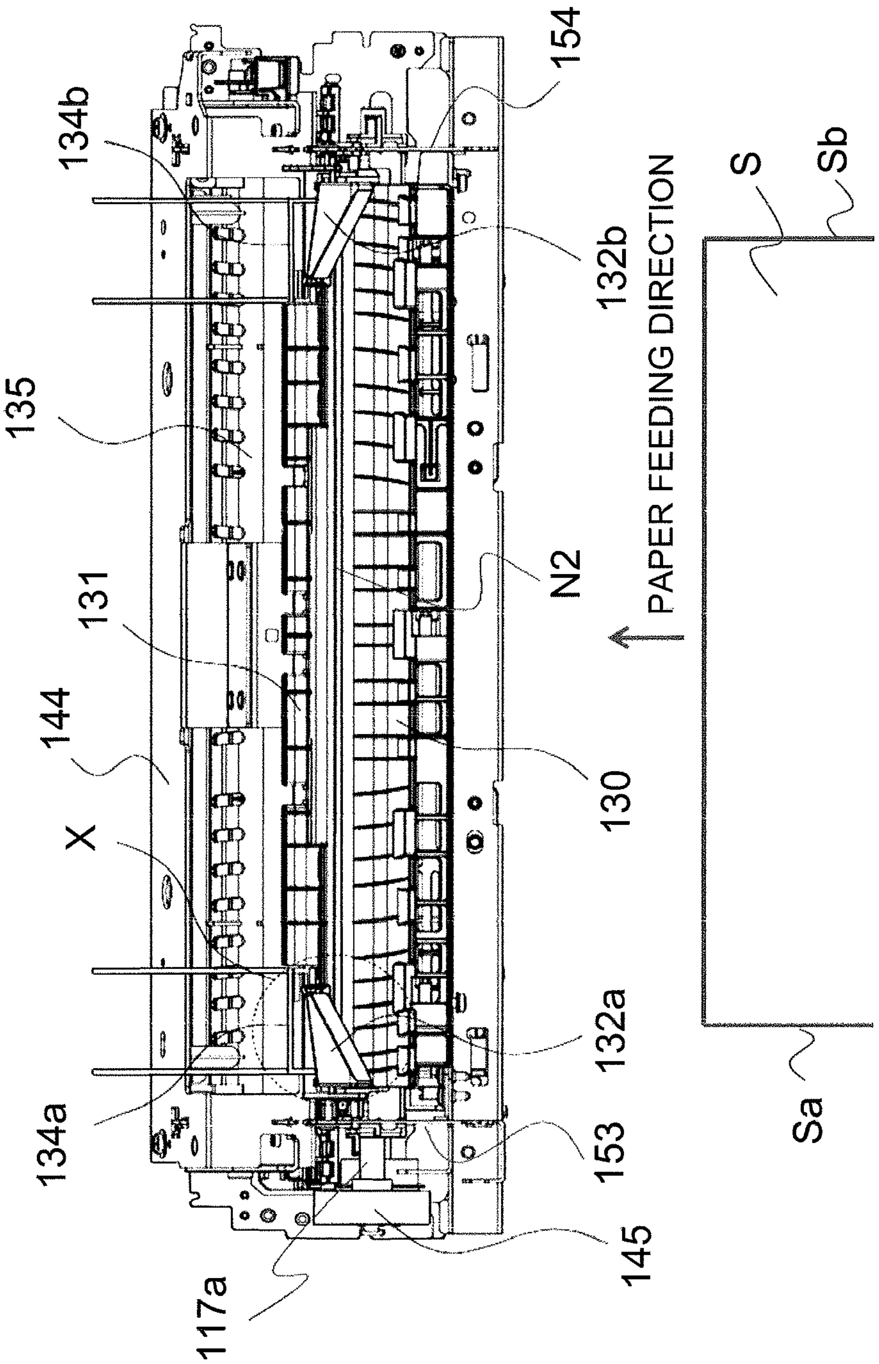
FIG. 3A is a schematic view of the fixing device as seen from an upstream side of a recording paper feeding direction.
Figure 3B:
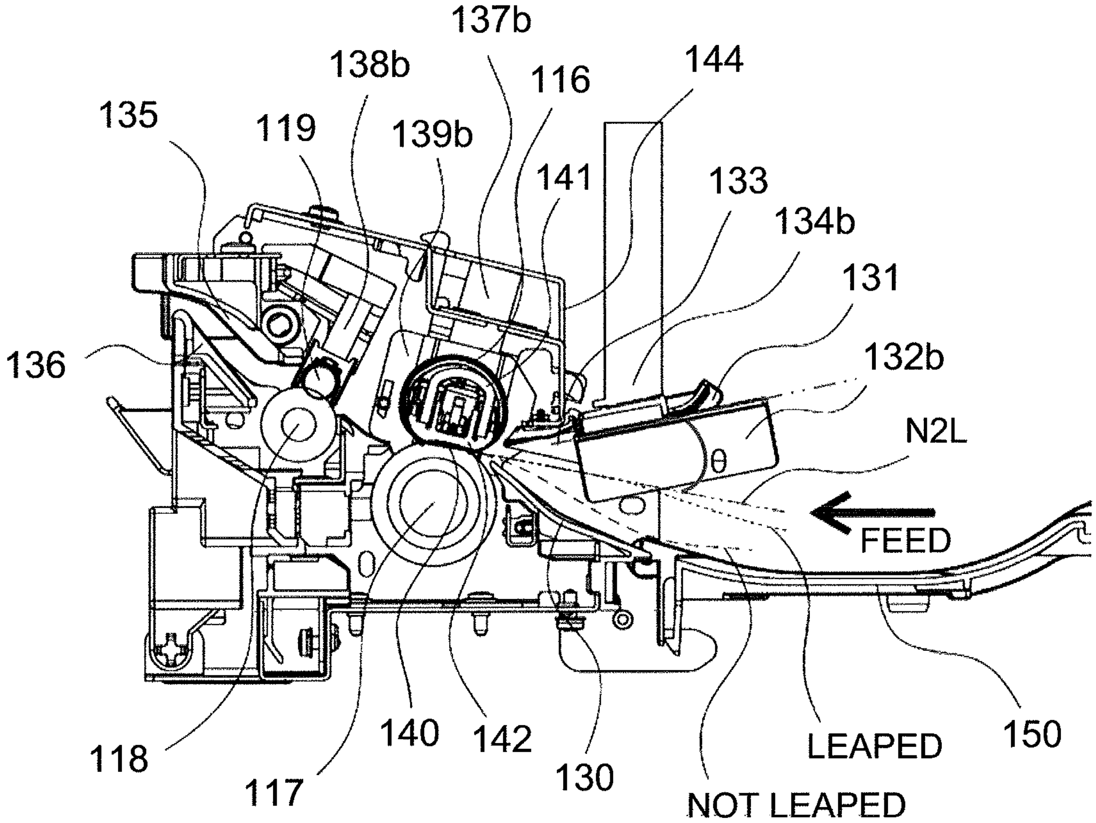
FIG. 3B is a sectional view of the fixing device.

FIG. 2 is a perspective view of the fixing device 103 when the fixing device 103 is seen from an upstream side of the recording paper feeding direction. Incidentally, FIG. 2 is the perspective view of the fixing device 103 in a state in which a cover for covering the fixing device 103 is removed so that the inside of the fixing device 103 can be seen. FIG. 3A is a schematic view of the fixing device 103 when the fixing device 103 is seen from the upstream side of the recording paper feeding direction, and FIG. 3B is a sectional view of the fixing device 103. In FIG. 4, (a) to (c) are schematic views each showing a principal portion of the fixing device 103, in which (a) is a sectional view showing the fixing belt and the pressing roller which form the fixing nip N2 and the like, (b) is the schematic view when the fixing belt and the pressing roller are seen from the upstream side of the recording paper feeding direction, and (c) is a schematic view showing a structure of a ceramic heater 140. The fixing device 103 is of a belt heating type in which the toner image t carried on the recording paper S is heated by the fixing belt.

In (a) and (b) of FIG. 4, a metal-made stay 141 and a heater holder (heating member supporting member) 142 formed of a heat-resistant resin material are provided. The holder 142 is reinforced by the stay 141. The ceramic heater (heating member) 140, a cylindrical fixing belt (rotatable heating member) 116, a pressing roller (rotatable pressing member) 117 and flanges (limiting members for limiting lateral movement (shift) of the belt) 139*a* and 139*b* are also provided.

The stay 141 is prepared by bending a metal plate of stainless steel or the like into U-shape in cross section. The heater holder 142 includes a holder base portion 142*a* and a pair of projected pieces 142*b* provided on an upper surface of the holder base portion 142*a*. The holder base portion 142*a* is engaged and assembled with the stay 141 so as to sandwich the pair of projected pieces 142*b*.

The heater 140 includes an elongated ceramic heater substrate 140*a* having a high heat-resistant property. At a lower surface of the substrate 140*a*, a heat generating resistor 140*b* for generating heat along a longitudinal direction of the substrate 140*a* by supply of electric power is formed by printing. Further, at the lower surface of the substrate 140*a*, an electroconductive portion 140*c* for supplying the electric power to the heat generating resistor 140*b* and an electrode portion 140*d* for supplying the electric power to the heat generating resistor 140*b* via the electroconductive portion 140*c* are formed by printing. Further, at the lower surface of the substrate 140*a*, a glass coat layer (protective layer) 140*e* for protecting the heat generating resistor 140*b* is provided so as to cover the heat generating resistor 140*b* is provided.

The holder base portion 142*a* of the heater holder 142 is provided with a recessed groove portion 142*c* along the longitudinal direction. The heater 140 is supported by the recessed groove portion 142*c*.

At an outer periphery of the heater 140 and the heater holder 142 including the holder base portion 142*a* to which the heater 140 is mounted, the fixing belt 116 is externally engaged loosely.

As shown in (b) of FIG. 4, at one end portion of the fixing belt 116, the flange 139*a* is provided, and at the other end portion of the fixing between 116, the flange 139*b* is provided. The flanges 139*a* and 139*b* include base portions 139*a*1 and 139*b*1, respectively, limiting portions 139*a*2 and 139*b*2, respectively, for limiting the lateral movement of the belt, and guide portions 139*a*3 and 139*b*3, respectively, for guiding an inner surface of the belt.

The base portions 139*a*1 and 139*b*1 of the flanges 139*a* and 139*b* are mounted at end portions, respectively, of the stay 141 with respect to the longitudinal direction. Further, these flanges 139*a* and 139*b* are inserted into grooves provided in front fixing frames 153 and 154, respectively, of the fixing device 103.

The pressing roller 117 includes a core metal 117*a* and an elastic layer 117*b* formed on the core metal 117*a*. As a material for the elastic layer 117*b*, it is possible to use a heat-resistant rubber such as a silicone rubber or a fluorine-containing rubber. Further, an outer peripheral surface of the elastic layer 117*b* is coated with a parting layer 117*c* of a fluorine-containing resin material or the like. The pressing roller 117 is disposed opposed to the heater 140 via the fixing belt 116. Further, the core metal 117*a* of the pressing roller 117 is rotatably held at end portions thereof by the front fixing frames 153 and 154 via bearings (not shown).

At upper surfaces of the base portions 139*a*1 and 139*b*1 of the belt flanges 139*a* and 139*b*, pressing plates 143*a* and 143*b* (FIG. 2) are provided, respectively. The pressing plates 143*a* and 143*b* are urged, toward the pressing roller 117 held by the frames 153 and 154, respectively, by compression coil springs 137*a* and 137*b*, respectively. By this pressing (urging) mechanism, the heater 140 is urged toward the pressing roller1 117 via the fixing belt 116, so that the fixing nip N2 is formed.

(2-2) Heat Fixing Operation of Fixing Device 103

The controller 200 rotationally drives a motor (not shown) for the fixing device 103 in accordance with the print instruction. Rotation of an output shaft of the motor is transmitted, via a predetermined (speed) reduction gear train (not shown), to a pressing roller gear 145 (FIG. 2) provided to the core metal 117*a* of the pressing roller 117. As a result, the pressing roller 117 is rotated in an arrow direction ((a) of FIG. 4). The rotation of the pressing roller 117 is transmitted to the fixing belt 116 at the fixing nip N2. As a result, the fixing belt 116 is rotated in an arrow direction ((a) of FIG. 4) by following the rotation of the pressing roller 117 while contacting the surface of the glass coat layer 140*e* of the heater 140 at the inner peripheral surface thereof.

Onto the inner surface of the fixing belt 116, grease (lubricant) is applied, so that a sliding property of the fixing belt 116 on the heater 140 and the heater holder 142 is ensured.

The controller 200 fetches a detected signal (output signal) outputted from a thermistor (temperature detecting means) 201 provided on the substrate 140*a* of the heater 140. Then, by driving a triac 202 on the basis of the detected signal, the electric power to be supplied from a power source 203 to the heat generating resistor 140*b* is controlled. As a result, the heater 140 is kept at a predetermined fixing temperature (target temperature).

The recording paper S on which the (unfixed) toner image is carried is guided by a feeding guide 150 (FIG. 3B) and is fed to the fixing device 103. The recording paper S is guided by a lower entrance guide (FIG. 3B) provided in the upstream side of the recording paper feeding direction in the fixing device 103 and is introduced into the fixing nip N2. Then, the toner image is heat-fixed on the recording paper S while being nipped and fed through the fixing nip N2.

In FIG. 2, a paper discharging roller gear 147 is fixed to a shaft of the paper discharging roller 118 (FIG. 3B). The paper discharging roller gear 147 is connected with a pressing roller gear 145 via an idler gear 146 (FIG. 2). By the rotation of the pressing roller gear 145, the paper discharging roller 118 is rotationally driven in the same direction as the rotational direction of the pressing roller 117.

An opposite roller 119 is rotated by the rotation of the paper discharging roller 118. The roller 119 is urged toward the roller 118 by springs 138*a* and 138*b*.

In FIGS. 3A and 3B, guides 135 and 136 for guiding the recording paper S, fed by a roller pair of the paper discharging roller 118 and the opposite roller 119, to the outside of the fixing device 103 are provided.

An upper entrance guide (entrance guide) 131 is provided in a recording paper entrance side of the fixing device 103 as shown in FIG. 3A and is fixed on the stay 144 provided between the frames 153 and 154. An entrance end portion guide 133 is provided by being hung from above in the neighborhood of the fixing nip N2 in the fixing device 103. The upper entrance guide 131 is, as shown in FIG. 3B, disposed so as to intersect, at a predetermined angle θ, with a fixing nip line N2L as an extension line of the fixing nip N2 toward the upstream side of the recording paper feeding direction. The upper entrance guide 131 and the entrance end portion guide 133 are, in the case where the recording paper S is curved upward at a leading end thereof in FIG. 3B, constituted so as to guide the recording paper S to the fixing nip N2 while pressing down the leading end of the recording paper S.

In the fixing device 103 in this embodiment, an outer shape (configuration) of the pressing roller 117 with respect to the longitudinal direction is formed in a reverse crown shape such that the outer shape is smoothly recessed from end portions toward a longitudinal central portion of the pressing roller 117 ((b) of FIG. 4). As a result, generation of creases on the recording paper S can be suppressed in a feeding process of the recording paper S, but as described above, a difference in feeding amount is generated between a width central portion and a widthwise end portion of the recording paper S, so that the trailing end leap such that the trailing end of the recording paper S is raised can occur.

Therefore, swingable guides (guide members) are provided at an entrance to the fixing portion and at end portions with respect to a direction perpendicular to the feeding direction of the recording material (recording paper). The swingable guides will be described below.

(2-3) Structure and Operation of Swingable Guides 132*a* and 132*b*

In FIG. 3A, swingable guides 132*a* and 132*b* and guide holders (supporting members) 134*a* and 134*b* are provided. As shown in the figure, a pair of the guide and the guide holder (132*a* and 134*a* oar 132*b* and 134*b*) is provided at one of the end portions in the neighborhood of the entrance to the fixing device 103. In a state in which the recording paper S enters the fixing nip N2, when the trailing end of the recording paper S is leaped, edges Sa and Sb of the recording paper S contact the swingable guides 132*a* and 132*b*, respectively. The guide holders 134*a* and 134*b* are disposed by being hung from above the fixing device 103 in the image forming apparatus main assembly 100.

FIG. 5 is an enlarged view of portion X shown in FIG. 3A, and is a schematic view for illustrating a mounting structure of the swingable guide 132*a* to the guide holder 134*a*. In FIG. 5, for explanation, the swingable guide 132*a* is simply illustrated by omitting an upstream side of the fixing device 103 with respect to the recording paper feeding direction. In the following, only a structure of the swingable guide 132*a* is described, but the structure of the swingable guide 132*b* is the same, and therefore the structure of the swingable guide 132*b* will be omitted from description.

The swingable guide 132*a* is rotatably mounted to the guide holder 134*a* so that an inside of the swingable guide 132 with respect to a direction perpendicular to the recording paper feeding direction is a rotation center. In this embodiment, a hook-shaped engaging portion 132*a*1 provided to the swingable guide 132*a* is mounted by being loosely engaged rotatably with a round shaft-shaped engaging portion 134*a*1 provided to the guide holder 134*a* so as to be substantially in parallel to the upper entrance guide 131.

Further, the swingable guide 132*a* includes a rotation stopper portion 132*a*2. The rotation stopper portion 132*a*2 is loosely inserted into a hole 134*a*2 provided in the guide holder 134*a* in a state provided with play. An end of the rotation stopper portion 132*a*2 is provided with a claw portion 132*a*3 for being locked at a periphery of the hole 134*a*2 of the guide holder 134*a*. The claw portion 132*a*3 of the rotation stopper portion 132*a*2 is locked by the guide holder 134*a*, so that motion of the swingable guide 132*a* in a vertically downward direction is suppressed, but the swingable guide 132*a* is freely moved in a vertically upward direction.

In this way, the swingable guide 132*a* supported by the guide holder 134*a* is swingable about the engaging portion 132*a*1, as a rotation (swing) center, by a self-weight thereof (in an arrow "UP" direction in FIG. 6). In FIG. 5, a broken line represents a position of the swingable guide 132*a* before the swing, and a solid line represents an example of a position of the swingable guide 132*a* when the swingable guide 132*a* is swung by being pushed by the recording paper S.

Incidentally, when the leading end of the recording paper S is nipped and fed at the fixing nip N2 of the fixing device 103, the trailing end of the recording paper S is ordinarily fed along a path indicated as "NOT LEAPED" in FIG. 3B, and therefore is prevented from contacting the swingable guides 132*a* and 132*b*.

However, in the case where a reverse crown amount (amount of a difference between the longitudinal end portion and the longitudinal central portion) of the pressing roller 117 is increased due to insufficient part accuracy or the like, the recording paper S causes the trailing end leap and is fed along a path indicated as "LEAPED" in FIG. 3B. At this time, the recording paper S is fed while contacting the swingable guides 132*a* and 132*b* at the widthwise end portions Sa and Sb thereof, respectively. Further, also in the case where thick paper or the like of which degree of hang down of the trailing end thereof is small is fed, the end portions Sa and Sb of the recording paper S can contact the swingable guides 132*a* and 132*b*.

FIG. 6 is a schematic view for illustrating an operation of the swingable guide 132*a* when the recording paper S causes the trailing end leap. As shown in FIG. 6, the recording paper S contacts a lower edge 132*a*4 at the end portion Sa thereof to suppress the trailing end leap of the recording paper S. By this function of suppressing the trailing end leap of the recording paper S by the lower edge 132*a*4 of the swingable guide 132*a*, it is possible to suppress contact of a toner image print region on the recording paper S with peripheral parts, of the fixing device 103, such as the upper entrance guide 131 in the neighborhood of the fixing device 103. As a result, it becomes possible to effectively suppress image rubbing during generation of the trailing end leap of the recording paper S. Further, it is possible to suppress generation of image blur due to an impact of the generation of the trailing end leap of the recording paper S.

Further, the swingable guide 132*a* is swingably disposed as described above, and therefore the end portion Sa of the recording paper S is raised in the substantially vertically upward direction by the contact with the lower edge 132*a*4 of the swingable guide 132*a*. That is, the swingable guide 132*a* is moved upward (in the arrow "UP" direction) when being pushed by the recording paper S. In FIG. 6, a broken line represents a position of the swingable guide 132*a* before the swing, and a solid line represents a position of the swingable guide 132*a* after the swing. By constituting the swingable guide 132*a* as described above, compared with the case where the swingable guide 132*a* is fixed, durability of the recording paper S against rubbing becomes better.

In the above, only the operation of the swingable guide 132*a* is described, but also the operation of the swingable guide 132*b* is the same.

As described above, it is possible to provide an image forming apparatus including the swingable guides 132*a* and 132*b* having good durability while suppressing the trailing end leap of the recording paper S.

Embodiment 2

Another embodiment of the image forming apparatus according to the present invention will be described.

FIG. 7 is a perspective view of a fixing device 103 mounted in the image forming apparatus in this embodiment. Incidentally, also in FIG. 7, similarly as in FIG. 2, a state in which a cover for covering the fixing device 103 is removed so that the inside of the fixing device 103 can be seen. FIG. 8 is a schematic view of the fixing device 103 shown in FIG. 7 when the fixing device 103 is seen from an upstream side of the recording paper feeding direction.

In Embodiment 1, the guide holders 134*a* and 134*b* were hung from the image forming apparatus main assembly. On the other hand, the guide holders 134*a* and 134*b* are fixed to an upper stay 144 of the fixing device 103. The image forming apparatus has the same constitution as that of the image forming apparatus in Embodiment 1 except for this point. That is, the swingable guides 132*a* and 132*b* are held by the guide holders 134*a* and 134*b* in the same manner as that in Embodiment 1, and therefore will be omitted from detailed description.

Also in this embodiment, it is possible to provide an image forming apparatus including the swingable guides 132*a* and 132*b* having good durability against abrasion due to rubbing with the end portions Sa and Sb of the recording paper S while suppressing the trailing end leap of the recording paper S.

In the image forming apparatus in this embodiment, compared with the image forming apparatus in Embodiment 1, the guide holders 134*a* and 134*b* can be downsized. Further, the swingable guides 132*a* and 132*b* and the guide holders 134*a* and 134*b* are incorporated into the fixing device 103, so that accuracy of the positions of the swingable guides 132*a* and 132*b* relative to the fixing nip N2 is improved. As a result, it becomes possible to effectively suppress (press down) the trailing end leap of the recording paper S by the swingable guides 132*a* and 132*b* and to effectively suppress the image rubbing during the generation of the trailing end leap of the recording paper S.

Embodiment 3

Another embodiment of the image forming apparatus according to the present invention will be described.

FIG. 9 is a perspective view of a fixing device 103 mounted in the image forming apparatus in this embodiment. FIG. 10 is a schematic view of the fixing device 103 shown in FIG. 9 when the fixing device 103 is seen from an upstream side of the recording paper feeding direction.

In the image forming apparatuses in Embodiments 1 and 2, the swingable guides 132*a* and 132*b* are supported by the guide holders 134*a* and 134*b* but in the image forming apparatus in this embodiment, the swingable guides 132*a* and 132*b* are supported by the upper entrance guide 131.

FIG. 11 is an enlarged view of a portion Z in FIG. 10, and an illustration showing a structure of a mounting portion of the swingable guide 132*a* to the upper entrance guide 131. In FIG. 11, for explanation, the swingable guide 132*a* is simply illustrated by partly extracting the fixing device 103. In the following, the structure and an operation of the swingable guide 132*a* will be described, but also the structure and the operation of the swingable guide 132*b* are the same and therefore will be omitted from description.

The swingable guide 132*a* is rotatably mounted to an end portion of the upper entrance guide 131. In this embodiment, a hook-shaped engaging portion 132*a*1 provided to the swingable guide 132*a* is mounted by being loosely engaged rotatably with a round shaft-shaped engaging portion 131*a*1 provided to the upper entrance guide 131 so as to be substantially in parallel to the upper entrance guide 131. In FIG. 11, the upper entrance guide 131 is provided with a hole 131*a*2 into which the engaging portion 132*a*1 is loosely inserted with play, so that the swingable guide 132*a* is rotatably engaged with the round shaft-shaped engaging portion 131*a*1.

Further, the swingable guide 132*a* is provided with a rotation stopper portion 132*a*2 which is loosely inserted into a hole 131*a*3 provided in the upper entrance guide 131 in a state provided with play. An end of the rotation stopper portion 132*a*2 is provided with a claw portion 132*a*3 for being locked at a periphery of the hole 131*a*23 of the upper entrance guide 131. The claw portion 132*a*3 of the rotation stopper portion 132*a*2 is locked by the upper entrance guide 131, so that motion of the swingable guide 132*a* in a vertically downward direction is suppressed, but the swingable guide 132*a* is freely moved in a vertically upward direction.

In this way, the swingable guide 132*a* supported by the upper entrance guide 131 is swingable about the engaging portion 132*a*1, as a rotation (swing) center, by a self-weight thereof. In FIG. 12, a broken line represents a position of the swingable guide 132*a* before the swing, and a solid line represents an example of a position of the swingable guide 132*a* when the swingable guide 132*a* is swung by being pushed by the recording paper S.

Also in this embodiment, it is possible to provide an image forming apparatus including the swingable guides 132*a* and 132*b* having good durability against abrasion due to rubbing with the end portions Sa and Sb of the recording paper S while suppressing the trailing end leap of the recording paper S.

In the image forming apparatus in this embodiment, there is no need to provide the guide holders 134*a* and 134*b* used in Embodiments 1 and 2, so that the number of parts of the image forming apparatus can be reduced. Further, similarly as in the image forming apparatus in Embodiment 2, the swingable guides 132*a* and 132*b* are incorporated into the fixing device 103, so that accuracy of the positions of the swingable guides 132*a* and 132*b* relative to the fixing nip N2 is improved. In addition, the swingable guides 132*a* and 132*b* are supported by the upper entrance guide 131, so that accuracy of the positions of the swingable guides 132*a* and 132*b* relative to the upper entrance guide 131 is improved. As a result, it becomes possible to effectively suppress the image rubbing during the generation of the trailing end leap of the recording paper S.

Embodiment 4

Another embodiment of the image forming apparatus according to the present invention will be described.

In the image forming apparatuses in Embodiments 1 to 3, the upper entrance guide 131 is fixed, but in the image forming apparatus in this embodiment, the upper entrance guide 131 is rotatably held so as to move to a position where the entrance to the fixing portion is blocked and a position where the entrance to the fixing portion is open (exposed). Further, the swingable guide 132 is supported by the upper entrance guide 131 similarly as in Embodiment 3.

FIGS. 12A and 12B are schematic views each showing a position (in a state in which the entrance to the fixing portion is open) of the upper entrance guide 131 in an operation state (during paper (sheet) passing) of the fixing device 103. Of these figures, FIG. 12A is the schematic view of the fixing device 103 as seen from an upstream side of the recording paper feeding direction, and FIG. 12B is a sectional view of the fixing device 103. FIGS. 13A and 13B are illustrations each showing a position (in a state in which the entrance to the fixing portion is closed) of the upper entrance guide 131 of the fixing device 103 when a user accesses the neighborhood of a feeding guide 150 during, e.g., jam clearance.

A method-made frame 153 and a resin-made cover 151 for covering the frame and the like are provided with a long mechanism for swinging the upper entrance guide 131 ((a) and (b) of FIG. 14). A summary of an operation of the link mechanism is shown in FIG. 14. In FIG. 14, (a) shows a state in which the upper entrance guide 131 is open, i.e., a state during operation (print-enabled state), and (b) shows a state in which the upper entrance guide 131 is closed (print-disabled state).

In FIGS. 12 to 14, an open and close button 155 is mounted to the cover 151. The open and close button 155 is urged in a direction (leftward direction in (a) of FIG. 14), in which the open and close button 155 is projected, by a spring (not shown) provided inside the cover 151. A cam shaft 156 is rotatably supported by a frame 153. The cam shaft 156 contacts the open and close button 155. Each of contact portions 155*a* and 156*a* ((a) and (b) of FIG. 19) between the open and close button 155 and the cam shaft 156 has an inclined surface shape, converts linear motion of the open and close button 155 into rotational motion. A rotatable link plate A 157 is provided on the cam shaft 156 and is provided with an engaging hole H engaged with a boss G. A rotation center of the link plate A 157 is engaged with a link plate shaft 159 fixed to the frame 153, so that the link plate A 157 is interrelated with the rotational motion of the cam shaft 156 to perform the rotational motion.

A rotatable position B 158 is engaged with the link plate A 157. The link plate B 158 is, similarly as in the link plate A 157, engaged with the link plate shaft 159 at a rotation center thereof, and is interrelated with the rotational motion of the position A 157 to perform the rotational motion.

Between the frame 153 and the same shaft 156, a returning spring A 160 is provided, and between the link plate A 157 and the link plate B 158, a returning spring B 161 is provided.

By the above constitution, when the open and close button is pushed in from the state of (b) of FIG. 14, in interrelation therewith, an elongated hole I provided in the link plate B 158 is rotated. The open and close button 155 is pushed in by a projection (not shown) provided on a front door (not shown) of the apparatus main assembly 100, and is the state shown in (a) of FIG. 14 in a state in which the front door is closed (operation state). When the user opens the front door for accessing the neighborhood of the feeding guide 150 for jam clearance or the like to eliminate (release) the push-in state of the open and close button 155, the open and close button 155 is in the state shown in (b) of FIG. 14. In this way, the upper entrance guide 131 is also used as a shutter for protecting the fixing portion so as to prevent the user access by blocking the entrance to the fixing portion.

In FIG. 15, (a) and (b) are enlarged views for illustrating a structure of a mounting portion between the upper entrance guide 131 and the swingable guide 132*a*. In FIG. 15, (a) is a perspective view showing the mounting portion between the upper entrance guide 131 and the swingable guide 132*a* as seen from a front surface side as a paper passing surface side of the swingable guide 132*a*, and (b) is a perspective view showing the mounting portion between the upper entrance guide 131 and the swingable guide 132*a* as seen from a back surface side as a non-paper-passing surface side of the swingable guide 132*a*. The structure of the mounting portion between the upper entrance guide 131 and the swingable guide 132*a* will be described, but a structure of a mounting portion between the upper entrance guide 131 and the swingable guide 132*b* is the same.

The upper entrance guide 131 is provided with an opening window 131*w* for permitting mounting of the swingable guide 132*a* at an end portion thereof with respect to a direction perpendicular to the recording paper feeding direction. Further, in the back surface side of the upper entrance guide 131, an engaging hole K is provided.

The swingable guide 132*a* is provided with a boss L in place of the rotation stopper portion 132*a*2 described above. Further, the swingable guide 132*a* is provided with bosses M and N in place of the above-described engaging portion 132*a*1. The boss L is loosely inserted with play into an arcuate elongated hole J provided in an outside plate portion 131*g* of the upper entrance guide 131, and is movable along the elongated hole J. Also the boss M is loosely engaged with play in the engaging hole K and is rotatable about the engaging hole K. The boss N is incorporated so as to contact a flat plane F in the back surface side of the upper entrance guide 131.

FIGS. 16A and 16B show a state when the upper entrance guide 131 into which the swingable guides 132 are incorporated is assembled with the covers 151 and 152 and the frames 153 and 154.

First, FIG. 16A will be described. The boss L is, as also described with reference to FIG. 15, projected from the swingable guide 132*a* and is inserted into a U-shaped supporting recessed portion 151*a* provided in an inside side surface of the cover 151. A boss P provided on the upper entrance guide 131 is a rotation center of the upper entrance guide 131, and is engaged with a hole Ra provided in the frame 153. A boss Q provided on the upper entrance guide 131 receives a force, from the position B 158, for rotating the upper entrance guide 131, and is inserted into the elongated hole I in the link plate B 158.

Next, FIG. 16B will be described. A boss O is projected from the swingable guide 132*b*, and is inserted into a U-shaped supporting recessed portion 151*b* provided on the cover 152. A boss R is provided in a position correspondingly to the boss P in FIG. 16A and is a rotation center of the upper entrance guide 131, and is engaged with a hole Rb provided in the frame 154.

By the above constitution, the upper entrance guide 131 is rotated in interrelation with movement of the open and close button 155 by the pushing-in or the elimination of the pushing-in, thus also functioning as the shutter for blocking (covering) the entrance to the fixing portion.

Further, positions of the swingable guides 132*a* and 132*b* in the operation state of the fixing device 103 shown in FIG. 12 are the same as those of the swingable guides 132*a* and 132*b* described in Embodiments 1 to 3. On the other hand, in a state in which the upper entrance guide 131 of the fixing device 103 closes the entrance to the fixing portion as shown in FIG. 13, when the positions of the swingable guides 132*a* and 132*b* are the same as the positions of FIG. 12, there is a fear that the swingable guides 132*a* and 132*b* contact the feeding guide 150 to damage the feeding path. Therefore, in the closed state of the upper entrance guide 131 of the fixing device 103, there is a need to retract the swingable guides 132*a* and 132*b* so as not to contact the feeding guide 150.

In FIG. 17, (a) and (b) are enlarged views for illustrating a position of the swingable guide 132*a* of the fixing device 103 in the operation state (i.e., a state in which the upper entrance guide 131 opens the entrance to the fixing portion and functions as the guide for the recording paper). In FIG. 17, (a) is a perspective view showing the neighborhood of the entrance of the fixing device 103 as seen from an end side with respect to the longitudinal direction of the fixing device 103, and (b) is a perspective view showing the neighborhood of the entrance of the fixing device 103 as seen from obliquely above the fixing device 103.

As shown in FIG. 15, with respect to the guide 132*a*, the boss M is loosely inserted into the engaging hole K of the upper entrance guide 131, and the boss L is engaged with the bottom of the elongated hole J of the upper entrance guide 131. Here, the swingable guide 132*a* is likely to be rotated about, as the rotation center, a line connecting the bosses M and L, but this rotation is stopped by contact of the boss N with the flat plane F in the back surface side of the upper entrance guide 131, so that the swingable guide 132*a* is positioned.

That is, in a swing center side of the swingable guide 132*a*, an operation of the swingable guide 132*a* is limited by the loose engagement between the boss M and the engaging hole K, but in the boss L side of the swingable guide 132*a*, the swingable guide 132*a* is in a freely movable state in the substantially vertically upward direction. For that reason, when the recording paper S causing the trailing end leap contacts the swingable guide 132*a*, the boss M as the loosely engaging portion and the boss N riding on the upper entrance guide 131 function as the rotation center. As a result, similarly as in Embodiments 1 to 3, in the boss L side of the swingable guide 132*a*, the swingable guide 132*a* is raised in the substantially vertically upward direction.

In FIG. 18, (a) and (b) are enlarged views for illustrating a position of the swingable guide 132*a* when the upper entrance guide 131 of the fixing device 103 is closed.

When the upper entrance guide 131 is closed, the boss L provided on the swingable guide 132*a* contacts a bottom surface 151*a*1 of the supporting recessed portion 151*a* provided on the cover 151, so that the swingable guide 132*a* is held. Accordingly, even when the upper entrance guide 131 is further moved in a direction in which the entrance to the fixing portion is closed, movement of the swingable guide 132*a* is limited by the surface 151*a*1. As a result, it is possible to prevent the swingable guide 132*a* from contacting the feeding guide 150. Here, the swingable guide 132*a* is likely to be rotated about, as the rotation center, the line connecting the bosses M and L, but a flat plane E ((a) of FIG. 15) of the swingable guide 132*a* contacts a rib T ((a) and (b) of FIG. 15) provided on the plate portion 131*g* of the upper entrance guide 131. As a result, the rotation of the swingable guide 132*a* about the line connecting the bosses M and L as the rotation center is limited. At this time, the upper entrance guide 131 and the swingable guide 132*a* are positioned so as to be placed in an intimate contact state in the upstream side of the recording paper feeding direction.

In this embodiment, the constitutions and actions of the upper entrance guide 131 and the swingable guide 132*a* are described, but also constitutions and actions of the upper entrance guide 131 and the swingable guide 132*b* are the same.

Also in this embodiment, it is possible to provide an image forming apparatus including the swingable guides 132*a* and 132*b* having good durability against abrasion due to rubbing of the end portions Sa and Sb of the recording paper S while suppressing the trailing end leap of the recording paper S.

Further, in the image forming apparatuses in Embodiments 1 to 3, there was a gap, needed when the swingable guides 132_a_ and 132_b_, between the upper entrance guide 131 and the swingable guides 132_a_ and 132_b_. For that reason, when the user performs the jam clearance, there is a fear that the recording paper S is coughed in the gap, so that a lowering in jam clearing property was invited. On the other hand, in the image forming apparatus in this embodiment, a constitution in which the upper entrance guide 131 and the swingable guides 132_a_ and 132_b_ are in the intimate contact state during the jam clearance is employed and thus the above-described gap is not created, and therefore an effect such that the jam clearance property is improved can be achieved.

Next, a sheet (paper) guide shape capable of effectively suppressing curl of the recording paper will be described. Incidentally, in the following description, a front (surface) side is a left side of the image forming apparatus main assembly as seen from an upstream side of the recording paper feeding direction. A rear (surface) side is a right side of the image forming apparatus main assembly as seen from the upstream side of the recording paper feeding direction.

Embodiment 5

The carl is generated in some cases on the recording material (recording paper) after the toner image is heat-fixed on the recording paper by the fixing device. This curl varies in size and direction depending on a humidity-absorbing state of the recording paper, a set direction of the recording paper, a heat-fixing condition of the fixing device, and the like.

In the case where, a double-side print job for printing the toner image on both sides (surfaces) of the recording paper in the image forming apparatus, the recording paper once passing through the fixing device is reversed and fed, and then the toner image is formed on a second surface of the recording paper by the image forming portion, and thereafter the recording paper is fed again to the fixing device.

In this case, when the curl is generated at the second surface leading end of the recording paper, the second surface leading end of the recording paper does not smoothly enter the fixing nip, so that "image peeling" caused by subjecting the second surface leading end to impact or "image rubbing" caused by contact of the second surface leading end with peripheral parts were generated. Hereinafter, this phenomenon is referred to as "improper entrance". A guide shape capable of suppressing such a phenomenon will be described.

An upper entrance guide (entrance guide) 131 is provided in a recording paper entrance side of the fixing device 103 as shown in (a) of FIG. 20 and is fixed on the upper stay 144. An entrance end portion guide 133 is provided by being hung from above in the neighborhood of the fixing nip N2 in the fixing device 103. The upper entrance guide 131 is, as shown in (b) of FIG. 20, disposed so as to intersect, at a predetermined angle θ, with a fixing nip line N2L as an extension line of the fixing nip N2 toward the upstream side of the recording paper feeding direction. The upper entrance guide 131 and the entrance end portion guide 133 are, in the case where the recording paper S is curved upward at a leading end thereof in (b) of FIG. 20, constituted so as to guide the recording paper S to the fixing nip N2 while pressing down the leading end of the recording paper S.

A material for the discharging roller 118 is a foamed silicone rubber having an Asker-C hardness of about 30 degrees, and a material for the opposite roller 119 is iron. The surface of the discharging roller 118 having the low hardness is pressed by the surface of the opposite roller 119 having the high hardness, so that a decal nip is formed along an outer diameter portion of the opposite roller 119 surface. The recording paper S is fed through the decal nip, so that the curl of the recording paper S formed in the fixing nip N2 is rectified toward an opposite direction. The recording paper S on which the curl is rectified is passed through the feeding path constituted by the guides 135 and 136 and then is discharged from the fixing device 103.

In the fixing device 103 in this embodiment, an outer shape (configuration) of the pressing roller 117 with respect to the longitudinal direction is formed in a reverse crown shape such that the outer shape is smoothly recessed from end portions toward a longitudinal central portion of the pressing roller 117 in the front and rear sides ((b) of FIG. 4). As a result, generation of creases on the recording paper S can be suppressed in a feeding process of the recording paper S, but as described above, a difference in feeding amount is generated between a width central portion and a widthwise end portion of the recording paper S, so that the trailing end leap such that the trailing end of the recording paper S is raised can occur. Further, there is a possibility that a "trailing end leap defect" caused by the trailing end leap as described above is generated. Further, in the case where the toner image is printed on the both surfaces of the recording paper S, when the curl is generated at the second surface leading end of the recording paper S, there is a possibility that the "improper entrance" as described above is caused.

Therefore, in order to smoothly introduce the recording paper into the fixing nip of the fixing device while suppressing the "trailing end leap defect" and the "improper entrance" of the recording paper, an introducing guide for guiding the recording paper into the fixing nip is provided in the neighborhood of the recording paper entrance of the fixing device 103.

(2-3) Structure of Introducing Guide 132

With reference to FIG. 20 and FIGS. 21 to 25, a structure of an introducing guide 1132 will be described. FIG. 21 is an enlarged view of a portion A in (a) of FIG. 20 and shows the introducing guide 1132. FIG. 22 is a sectional view taken along B-B line indicated in (a) of FIG. 20. FIG. 23 is an enlarged view of a portion C in FIG. 22, and shows an introducing guide 1132_b_ in the rear surface side. In FIG. 24, (a) to (c) are sectional views each showing a cross-sectional shape of the introducing guide 1132.

As shown in (a) of FIG. 20, the introducing guide 1132 is provided at each of longitudinal end portions of the upper entrance guide (supporting member) 131 ((a) of FIG. 20) of the fixing device 103. In this embodiment, only the structure of the rear (surface)-side introducing guide 1132 will be described, but the structure of the front (surface)-side introducing guide 1132 is also the same and therefore will be omitted from description.

The introducing guide 1132 includes a guide entrance portion 1132_a_, a guide portion 1132_c_, a nip guide portion 1132_d_ and the like (FIG. 21).

The guide entrance portion 1132_a_ is provided in an upstreammost side of the guide 1132 with respect to the recording paper feeding direction, and is positioned in a region closer to the fixing belt 116 than the fixing nip line N2L (FIG. 22). The nip guide portion 1132_d_ is provided in a downstreammost side of the guide 1132 with respect to the recording paper feeding direction, and is positioned in the region closer to the fixing belt 116 than the fixing nip line N2L and also in a region closer to the fixing nip line N2L than the guide entrance portion 1132_a_.

The guide portion 1132*c* is projected toward the side, (toner image print surface side) where the toner image t is formed on the surface of the recording paper S, so as to contact the widthwise end portion Sa from an outside end portion of the introducing guide 1132 with respect to the longitudinal direction. The guide portion 1132*c* is formed in a substantially right-angled triangular shape as seen from the front side (FIGS. 22 and 23).

In FIG. 24, (a) is a sectional view of the introducing guide 1132 taken along D-D line shown in FIG. 23, (c) is a sectional view of the introducing guide 1132 taken along F-F line shown in FIG. 23, and (b) is a sectional view of the introducing guide 1132 taken along E-E line in an intermediary position between the D-D line and the F-F line. As shown in (a) to (c) of FIG. 24, the guide portion 1132*c* has an inclined shape such that a recording paper feeding path 102*a* is narrowed with a position closer to the downstream side of the recording paper feeding direction.

Further, the guide portion 1132*c* is provided with a recording paper pressing portion 1132*b*, in the downstream side of the recording paper feeding direction, for suppressing not only the leading end curl of the recording paper S but also the "improper entrance" and the "trailing end leap defect" of the recording paper S. Further, distances L1 and L2 of the guide portion 1132*c* from the fixing nip line N2L are set to satisfy the following relationship. That is, the distance L1 shown in FIG. 22 is equal to or more than the distance L2 in the upstreammost position of the guide 1132 (the guide entrance portion 1132*a*) with respect to the recording paper feeding direction. Here, the distance L1 is a distance, between a longitudinal outside portion of the recording paper pressing portion 1132*b* and the fixing nip line N2L, with respect to a thickness direction of the recording paper S, and the distance L2 is a distance, between a longitudinal inside portion of the recording paper pressing portion 1132*b* and the fixing nip line N2L, with respect to the thickness direction of the recording paper S.

Further, the guide portion 1132*c* is disposed so that at least a corner (part) of the recording paper pressing portion 1132*a* is positioned in a predetermined position, which is closer to the downstream most side than the upstreammost side of the guide and which is positioned between the upstreammost side and the downstreammost side of the guide, and is positioned in a region in a side from the fixing nip line N2L toward the pressing roller 117 (FIG. 22). This corner (right-angle) portion is indicated by 1132*b*1 in FIG. 22.

By constituting the introducing guide 1132 as described above, as shown in FIGS. 25A to 25C, even in the case where the recording paper causes the curl at the leading end thereof, the guide entrance portion 1132*a* is disposed in the substantially horizontal direction with respect to the widthwise direction of the recording paper S, and therefore the leading end of the recording paper is not readily prevented from entering the fixing nip.

Further, the guide portion 1132*c* of the introducing guide 1132 is configured to form the recording paper pressing portion 1132*b* in the downstream side of the recording paper feeding direction by being lowered (in level) toward the toner image print surface side of the recording paper S while narrowing the recording paper feeding path 102*a* from the outside of the introducing guide 1132 with respect to the longitudinal direction. When the position of the right-angle portion 1132*b*1 of the recording paper pressing portion 1132*b* is set to be located over a toner image non-print region of the recording paper S, the recording paper S is fed while contacting the recording paper pressing portion 1132*b* only in the toner image non-print region. For that reason, the curl of the leading end of the recording paper S is suppressed by the recording paper pressing portion 1132*b* without having the influence on the toner image print region of the recording paper S, so that the recording paper S can be smoothly introduced into the fixing nip N2.

FIGS. 25A to 25C are illustrations showing a state in which the leading end curl of the recording paper S is suppressed (eliminated) by the introducing guide. 132.

For example, as shown in (a) of FIG. 25A, in the case where the end portion Sb of the recording paper S in the toner image print surface side enters the introducing guide 1132 along the recording paper feeding direction in a downwardly curled state with respect to the horizontal direction, the leading end portion Sb of the recording paper S is moderated fed into the guide portion 1132*c* by the guide entrance portion 1132*a*. Further, by the guide entrance portion 1132*a*, the leading end portion Sb of the recording paper S is moderately fed to the recording paper pressing portion 1132*b*. Then, as shown in (b) of FIG. 25A, the downward curl of the end portion Sa of the recording paper S is pressed down by the recording paper pressing portion 1132*b*.

Further, as shown in (a) of FIG. 25B, in the case where the leading end portion Sb of the recording paper S in the toner image print surface side enters the introducing guide 1132 along the recording paper feeding direction in a upwardly curled state in the direction perpendicular to the recording paper feeding direction, the leading end portion Sb of the recording paper S is moderated fed into the guide portion 1132*c* by the guide entrance portion 1132*a*. Further, by the guide entrance portion 1132*a*, the leading end portion Sb of the recording paper S is moderately fed to the recording paper pressing portion 1132*b*. Then, as shown in (b) of FIG. 25B, the upward curl of the end portion Sb of the recording paper S is pressed down by the recording paper pressing portion 1132*b*.

Further, as shown in (a) of FIG. 25C, in the case where the leading end portion Sb of the recording paper S in the toner image print surface side enters the introducing guide 1132 along the recording paper feeding direction in a downwardly curled state in the direction perpendicular to the recording paper feeding direction, the leading end portion Sb of the recording paper S is moderated fed into the guide portion 1132*c* by the guide entrance portion 1132*a*. Further, by the guide entrance portion 1132*a*, the leading end portion Sb of the recording paper S is moderately fed to the recording paper pressing portion 1132*b*. Then, as shown in (b) of FIG. 25C, the downward curl of the end portion Sa of the recording paper S is pressed down by the recording paper pressing portion 1132*b*.

As described above, the leading end portion Sb of the recording paper S in the toner image print surface side can be moderately fed to the recording paper pressing portion 1132*b* by the guide entrance portion 1132*a* and the guide portion 1132*c* of the guide 1132. As a result, it is possible to suppress the "image peeling" generated by subjecting the leading end portion Sb of the recording paper S to impact and the "image rubbing" generated by contact of the leading end portion Sb with peripheral parts when the toner image is printed on the both surfaces (sides) of the recording paper S, so that the generation of the "improper entrance" can be suppressed.

FIG. 26 is an illustration showing a state in which the trailing end leap is generated on a large-sized recording paper S1 or a small-sized recording paper S2 during feeding of the recording paper through the fixing nip N2 of the fixing device 103. In FIG. 27, (a) is a perspective view for illustrating a state in which the trailing end leap of the large-sized recording paper S1 is pressed down by the introducing guide 132, and (b) is a perspective view for illustrating a state in which the trailing end leap of the small-sized recording paper S2 is pressed down by the introducing generate 132.

In the case where the large-sized recording paper S1 causes the trailing end leap (FIG. 26), the recording paper S1 is fed by being pressed down by the recording paper pressing portion 1132*b* only in the toner image non-print region of the end portion Sa of the recording paper S1 ((a) of FIG. 27). As a result, it is possible to suppress contact of the toner image print region of the large-sized recording paper S1 with the peripheral parts such as the upper entrance guide 131 in the neighborhood of the entrance to the fixing device 103, so that the generation of the "trailing end leap defect" can be suppressed.

In the case where the small-sized recording paper S2 causes the trailing end leap (FIG. 26), the recording paper S2 is fed by being pressed down by the recording paper pressing portion 1132*b* only in the toner image non-print region of the end portion Sa of the recording paper S2 ((b) of FIG. 27). As a result, it is possible to suppress contact of the toner image print region of the small-sized recording paper S2 with the peripheral parts such as the upper entrance guide 131 in the neighborhood of the entrance to the fixing device 103, so that the generation of the "trailing end leap defect" can be suppressed.

Further, the guide entrance portion 1132*a* o the introducing guide 1132 is disposed in the substantially horizontal direction with respect to the widthwise direction of the recording paper S. Further, the introducing guide 1132 is disposed so that the guide portion 1132*c* is provided with the recording paper pressing portion 1132*b* by lowering the guide portion 1132*c* toward the toner image print surface side of the recording paper S while narrowing the recording paper feeding path 102*a* from the outside of the introducing guide 1132 with respect to the longitudinal direction. As a result, it is possible to suppress the generation of the "trailing end leap defect" and the "improper entrance" of the recording paper S while realizing space saving in a top surface side of the guide entrance portion 1132*a* of the guide portion 1132.

Embodiment 6

Another embodiment of the image forming apparatus according to the present invention will be described. In this embodiment, members and portions common to the image forming apparatuses in Embodiments 5 and 6 are represented by the same reference numerals or symbols and will be omitted from description.

The image forming apparatus in this embodiment has the same constitution as that of the image forming apparatus in Embodiment 5 except that a constitution of an introducing guide 1132 is different from the constitution of the introducing guide 1132 in Embodiment 5.

FIG. 28 is an enlarged view of the introducing guide 1132 in the rear (surface) side of the image forming apparatus as seen from the upstream side of the recording paper feeding direction. FIG. 29 is an enlarged view of the introducing guide 1132 shown in FIG. 28 as seen from the front (surface) side.

The introducing guide 1132 in this embodiment is characterized in that the guide portion 1132*c* include at least one guide rib 1132*c*2 along a direction in which the guide portion 1132*c* is inclined. As shown in FIGS. 28 and 29, a plurality of guide ribs 1132*c*2 are formed, along the inclination direction of the guide portion 1132*c*, from the guide entrance portion 1132*a* to the recording paper pressing portion 1132*b* of the guide portion 1132*c*. These guide ribs 1132*c*2 are formed in parallel to each other along the inclination direction of the guide portion 1132*c*.

The image forming apparatus in this embodiment is capable of achieving the following effect by the guide ribs 1132*c*2 formed on the guide portion 1132*c* of the introducing guide 1132. In a process in which the end portion Sb of the recording paper S moves from the guide entrance portion 1132*a* of the introducing guide 1132 to the recording paper pressing portion 1132*b* of the guide portion 1132*b* of the guide portion 1132*c*, a contact area between the introducing guide 1132 and the recording paper S is decreased, so that a resistance during the feeding of the recording paper S can be reduced.

Incidentally, in Embodiments 5 and 6, the introducing guide 1132 may also be provided in a recording paper (material) feeding path to the fixing device 103, not in the fixing device 103.

Embodiment 7

FIGS. 30 to 32 are illustrations of a fixing device in this embodiment. In this embodiment, the upper entrance guide 131 described in Embodiment 4 is provided with the introducing guide 1132 having the shape described in Embodiment 5. Members having the same functions as those described in Embodiments 4 and are represented by the same reference numerals or symbols.

That is, the upper entrance guide 131 in this embodiment blocks (covers), when the button is turned off (i.e., is moved to the left side in FIG. 31), the entrance to the fixing portion by being rotated from the state shown in FIG. 32 in a direction indicated by an arrow. Further, the introducing guide 1132 is swingably provided relative to the upper entrance guide 131, and when the recording paper (sheet) S abuts against the introducing guide 1132, the introducing guide 1132 is moved in the upward direction by being pushed by the recording paper S. As a result, durability of the introducing guide 1132 is ensured.

Further, when the upper entrance guide 131 blocks the entrance to the fixing portion, a projection L provided on the introducing guide 1132 is supported by a groove 151*a*, so that movement of the introducing guide 1132 is limited. As a result, the introducing guide 1132 is prevented from damaging a recording paper (sheet) feeding path 150.

Further, a recording paper (sheet) guide portion 1132*c* of the introducing guide 1132 has a shape as described with reference to FIG. 24.

In this way, by employing the constitution in this embodiment, it is possible to smoothly feed the recording paper (sheet) into the fixing nip while ensuring durability of the introducing guide (swingable guide) 1132.

The present invention is not limited to the above-described embodiments with respect to the type in which the (unfixed) toner image is heated and pressed. The present invention is also applicable to a fixing device using a halogen heater in place of the ceramic heater and a fixing device using an induction heating type. The present invention is not limited to the fixing device using the fixing belt but may also be applicable to a fixing device using a fixing roller having high rigidity.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications Nos. 029061/2013, 029063/2013 and 014257/2014 filed Feb. 18, 2013, Feb. 18, 2013 and Jan. 29, 2014, respectively, which are hereby incorporated by reference.

What is claimed is:

1. An image forming apparatus comprising:

a fixing portion for fixing an unfixed toner image formed on a recording material to the recording material;

a first guide member for guiding the recording material, wherein said first guide member is provided at an entrance to said fixing portion and at an end portion with respect to a direction perpendicular to a feeding direction of the recording material and is provided at a side facing a surface of the recording material on which the unfixed toner image is formed; and a second guide member for guiding the recording material, wherein said second guide member is provided at the entrance to said fixing portion and is provided at a side opposite to the surface of the recording material on which the unfixed toner image is formed, wherein as seen in a longitudinal direction of said fixing portion, a surface of said second guide member contacting to the recording material is curved, and wherein said first guide member is moved when said first guide member is pushed by the recording material.

2. An image forming apparatus according to claim 1, wherein said first guide member is provided at a position where an edge of the recording material parallel to the feeding direction is contactable with said first guide member.

3. An image forming apparatus according to claim 1, wherein said first guide member is provided rotatably about an inside end portion thereof, as a rotation center, with respect to the direction perpendicular to the feeding direction.

4. An image forming apparatus according to claim 1, wherein said first guide member is returned to an original position by a self weight thereof when the recording material is spaced from said first guide member.

5. An image forming apparatus according to Claim 1, wherein said first guide member is inclined so as to approach the surface of the recording material, on which the unfixed toner image is formed, with a decreasing distance toward an outside end portion of said first guide member with respect to the direction perpendicular to the feeding direction.

6. An image forming apparatus according to claim 1, wherein said first guide member is held by a main assembly of said image forming apparatus.

7. An image forming apparatus according to claim 1, wherein said first guide member is held at said fixing portion.

8. An image forming apparatus according to claim 1, wherein said fixing portion includes a pair of rotatable members for forming a fixing nip through which the recording material is to be passed, and wherein at least one of the pair of rotatable members has a shape such that a diameter thereof is increased with a distance thereof toward the end portion with respect to the direction perpendicular to the feeding direction.

9. An image forming apparatus according to claim 1, wherein said first guide member is provided at the entrance to said fixing portion and at each of end portions with respect to the direction perpendicular to the feeding direction.

10. An image forming apparatus comprising:

a fixing portion for fixing an unfixed toner image formed on a recording material to the recording material;

a first guide member for guiding the recording material, wherein said first guide member is provided at an entrance to said fixing portion and at an end portion with respect to a direction perpendicular to a feeding direction of the recording material and is provided at a side facing a surface of the recording material on which the unfixed toner image is formed; and a second guide member for guiding the recording material, wherein said second guide member is provided at the entrance to said fixing portion and is provided at a side opposite to the surface of the recording material on which the unfixed toner image is formed, wherein as seen in a longitudinal direction of said fixing portion, a surface of said second guide member contacting to the recording material is curved, and wherein said first guide member is shaped so that a guide portion, of said first guide member, contactable with the recording material is inclined, with a distance toward a downstream side of the feeding direction, in a direction of narrowing a recording material feeding path.

11. An image forming apparatus according to claim 10, wherein said first guide member is provided at a position where an edge of the recording material parallel to the feeding direction is contactable with said first guide member.

12. An image forming apparatus according to claim 10, wherein said first guide member is held by a main assembly of said image forming apparatus.

13. An image forming apparatus according to claim 10, wherein said first guide member is held at said fixing portion.

14. An image forming apparatus according to claim 10, wherein said fixing portion includes a pair of rotatable members for forming a fixing nip through which the recording material is to be passed, and wherein at least one of the pair of rotatable members has a shape such that a diameter thereof is increased with a distance thereof toward the end portion with respect to the direction perpendicular to the feeding direction.

15. An image forming apparatus according to claim 10, wherein said first guide member is provided at the entrance to said fixing portion and at each of end portions with respect to the direction perpendicular to the feeding direction.

16. An image forming apparatus according to claim 10, wherein said first guide member is provided with at least one rib along a direction in which said first guide member is inclined.

* * * * *